US 10,307,832 B2

(12) United States Patent
Harif

(10) Patent No.: US 10,307,832 B2
(45) Date of Patent: Jun. 4, 2019

(54) DYNAMIC CLAMPING MECHANISM

(71) Applicant: No Screw Ltd., Holon (IL)

(72) Inventor: Gershon Harif, Ramat Gan (IL)

(73) Assignee: NO SCREW LTD., Holon (IL)

( * ) Notice: Subject to any disclaimer, the term of this patent is extended or adjusted under 35 U.S.C. 154(b) by 0 days.

(21) Appl. No.: 15/569,512

(22) PCT Filed: Apr. 21, 2016

(86) PCT No.: PCT/IL2016/050424
§ 371 (c)(1),
(2) Date: Oct. 26, 2017

(87) PCT Pub. No.: WO2016/174663
PCT Pub. Date: Nov. 3, 2016

(65) Prior Publication Data
US 2018/0297123 A1 Oct. 18, 2018

(30) Foreign Application Priority Data

Apr. 30, 2015 (IL) .......................................... 238546
May 28, 2015 (IL) .......................................... 239053

(51) Int. Cl.
  B23B 27/16     (2006.01)
  B23C 5/22      (2006.01)
(52) U.S. Cl.
  CPC ........ B23B 27/1662 (2013.01); B23C 5/2208 (2013.01); B23C 5/2221 (2013.01); B23B 2205/045 (2013.01); B23C 2210/165 (2013.01)
(58) Field of Classification Search
  CPC ............ B23B 27/1662; B23B 2205/04; B23B 2205/045; B23B 2270/09; B23C 5/2208;
  (Continued)

(56) References Cited

U.S. PATENT DOCUMENTS 3,027,623 A  4/1962 Severson
3,138,846 A  6/1964 Conti et al.
(Continued)

FOREIGN PATENT DOCUMENTS

AT        6206 B      12/1901
CN     1368416 A       9/2002
(Continued)

OTHER PUBLICATIONS

Thomson Scientific, "Database WPI", Week 198537, London GB. AN 1980-H5598C & SU709261.
(Continued)

Primary Examiner — Alan Snyder
(74) Attorney, Agent, or Firm — Dorsey & Whitney LLP

(57) ABSTRACT

A cutting tool holder (10) configured for mounting thereon a cutting insert (30) to form a cutting tool (1); the cutting insert (30) has a top face (32T), a bottom face (32B), at least one side wall (32S) extending between the top face (32T) and the bottom face (32B), and an insert bore (35) extending between the top face (32T) and the bottom face (32B); the cutting tool holder (10) comprises a body (12) and a fastening member (50), the body (12) comprising an insert seat (20) having a base surface (22) and being configured for receiving therein the cutting insert (30); and a seat bore (25) having an open end at the base surface (22); the fastening member (50) defines a fastening member axis (XFM) and comprises and shank portion (52) and a head portion (51) extending therealong; the shank portion (52) is configured for being received within the seat bore (25); and the head portion (51) comprises a first clamping region, and a second clamping region axially spaced therefrom and disposed between the shank portion (52) and the first clamping region; the fastening member (50) is configured for assuming a mounting position, in which the fastening member (50)
(Continued)

remains in engagement with the seat bore (25) in the mounting position while allowing positioning of the cutting insert (30) into the insert seat (20), and a securing position in which the first and second clamping regions are disposed so as to engage two axially-spaced regions of the cutting insert (30) thereby securing it in the insert seat (20).

14 Claims, 26 Drawing Sheets

(58) Field of Classification Search
CPC ............ B23C 5/2221; B23C 2210/165; B23C 2270/08
See application file for complete search history.

(56) References Cited

U.S. PATENT DOCUMENTS

| | | |
|---|---|---|
| 3,299,489 A | 1/1967 | Kurt |
| 3,341,919 A | 9/1967 | Lovendahl |
| 3,341,921 A | 9/1967 | Weller et al. |
| 3,341,923 A | 9/1967 | Kelm |
| 3,491,421 A | 1/1970 | Holloway |
| 3,648,341 A | 3/1972 | Viellet |
| 3,740,807 A | 6/1973 | Getts |
| 3,747,179 A | 7/1973 | Lovendahl |
| 3,787,941 A | 1/1974 | Novkov |
| 3,805,351 A | 4/1974 | Mayer |
| 3,913,197 A | 10/1975 | Wolf |
| 3,925,868 A | 12/1975 | Singh |
| 3,946,473 A | 3/1976 | Petersen |
| 4,035,887 A | 7/1977 | Hertel |
| 4,044,440 A | 8/1977 | Stier |
| 4,204,781 A | 5/1980 | Johann |
| 4,283,163 A | 8/1981 | Graefe et al. |
| 4,397,592 A | 8/1983 | Erickson |
| 4,398,853 A | 8/1983 | Erickson |
| 4,507,023 A | 3/1985 | Shikata |
| 4,527,930 A | 7/1985 | Harroun |
| 4,621,957 A | 11/1986 | Dillard et al. |
| 4,869,624 A | 9/1989 | Viellet |
| 5,167,473 A | 12/1992 | Barnett |
| 5,199,828 A | 4/1993 | Forsberg et al. |
| 5,836,724 A | 11/1998 | Satran et al. |
| 5,938,377 A | 8/1999 | Jordberg et al. |
| 6,155,754 A | 12/2000 | Jonsson et al. |
| 6,158,928 A | 12/2000 | Hecht et al. |
| 6,168,356 B1 | 1/2001 | Sjoo et al. |
| 6,579,042 B1 | 6/2003 | Shiraiwa |
| 7,144,205 B2 | 12/2006 | Sheffler et al. |
| 7,261,495 B1 | 8/2007 | Nelson et al. |
| 7,264,424 B2 | 9/2007 | Hansson et al. |
| 7,273,331 B2 | 9/2007 | Giannetti |
| 7,677,842 B2 | 3/2010 | Park |
| 7,775,750 B2 | 8/2010 | Satran et al. |
| 7,780,380 B2 | 8/2010 | Nagaya et al. |
| 8,568,064 B2 | 10/2013 | Carl |
| 8,821,079 B2 | 9/2014 | Hecht |
| 8,870,499 B2 | 10/2014 | Harif |
| 8,882,404 B2 | 11/2014 | Harif |
| 9,120,154 B2 | 9/2015 | Hecht et al. |
| 2003/0031519 A1 | 2/2003 | Hecht |
| 2005/0152754 A1 | 7/2005 | Wiman et al. |
| 2007/0003384 A1 | 1/2007 | Smilovici et al. |
| 2008/0166191 A1 | 7/2008 | Andersson et al. |
| 2008/0193233 A1 | 8/2008 | Park |
| 2009/0092451 A1 | 4/2009 | Harif |
| 2009/0238651 A1 | 9/2009 | Nguyen |
| 2010/0272522 A1 | 10/2010 | Hecht |
| 2011/0305532 A1 | 12/2011 | Harif |
| 2012/0082521 A1 | 4/2012 | Burtscher et al. |
| 2012/0170988 A1 | 7/2012 | Kountanya et al. |
| 2013/0004252 A1 | 1/2013 | Yoshioka |
| 2013/0051938 A1 | 2/2013 | Satran et al. |

FOREIGN PATENT DOCUMENTS

| | | |
|---|---|---|
| CN | 1623725 A | 6/2005 |
| CN | 101028654 A | 9/2007 |
| CN | 102781613 A | 11/2012 |
| DE | 1260926 B | 2/1968 |
| DE | 2443756 A1 | 4/1976 |
| DE | 2853313 A1 | 6/1980 |
| DE | 3301191 A1 | 7/1984 |
| EP | 0001764 A1 | 5/1979 |
| EP | 0037554 A1 | 10/1981 |
| EP | 0179033 A2 | 4/1986 |
| EP | 0300172 | 1/1989 |
| EP | 0402854 A2 | 12/1990 |
| EP | 0487478 A1 | 5/1992 |
| EP | 0730926 A1 | 9/1996 |
| EP | 2487001 A2 | 8/2012 |
| EP | 2614907 A1 | 7/2013 |
| GB | 1011658 A | 12/1965 |
| GB | 1527091 A | 10/1978 |
| GB | 1527092 A | 10/1978 |
| GB | 1584237 A | 2/1981 |
| GB | 2057940 A | 4/1981 |
| GB | 2098105 A | 11/1982 |
| JP | S4844661 B1 | 12/1973 |
| JP | S5431690 B1 | 3/1979 |
| JP | 57189718 A | 11/1982 |
| JP | Hei1-132319 | 9/1989 |
| JP | H03281115 A | 12/1991 |
| JP | H9-108909 | 4/1997 |
| JP | H09234608 A | 9/1997 |
| JP | 2001507287 A | 6/2001 |
| JP | 2004521767 A | 7/2004 |
| JP | 2008520447 A | 6/2008 |
| JP | 2010507496 A | 3/2010 |
| SE | 463703 B | 1/1991 |
| SE | 502241 A | 9/1995 |
| SU | 665993 | 6/1979 |
| SU | 703248 | 12/1979 |
| SU | 831394 | 5/1981 |
| SU | 848158 | 7/1981 |
| SU | 1079370 | 3/1984 |
| WO | 93/17822 | 9/1993 |
| WO | 96/26802 | 9/1996 |
| WO | 98/30349 | 7/1998 |
| WO | 99/54078 | 10/1999 |
| WO | 03/004204 | 1/2003 |
| WO | 03/022495 | 3/2003 |
| WO | 03/101653 | 12/2003 |
| WO | WO 2007/067138 A1 | 6/2007 |
| WO | 2007/098043 | 8/2007 |
| WO | 2007/134930 | 11/2007 |
| WO | 2008/114242 | 9/2008 |
| WO | 2008/149371 | 12/2008 |
| WO | 2009/028747 | 3/2009 |
| WO | 2015/033338 | 3/2015 |

OTHER PUBLICATIONS

International Search Report and Written Opinion from International Application No. PCT/IL2010/000162 dated Jun. 30, 2010.
Thomson Scientific, "XP-002587912 Abstract", WPI Week 198537, Jan. 8, 1984.

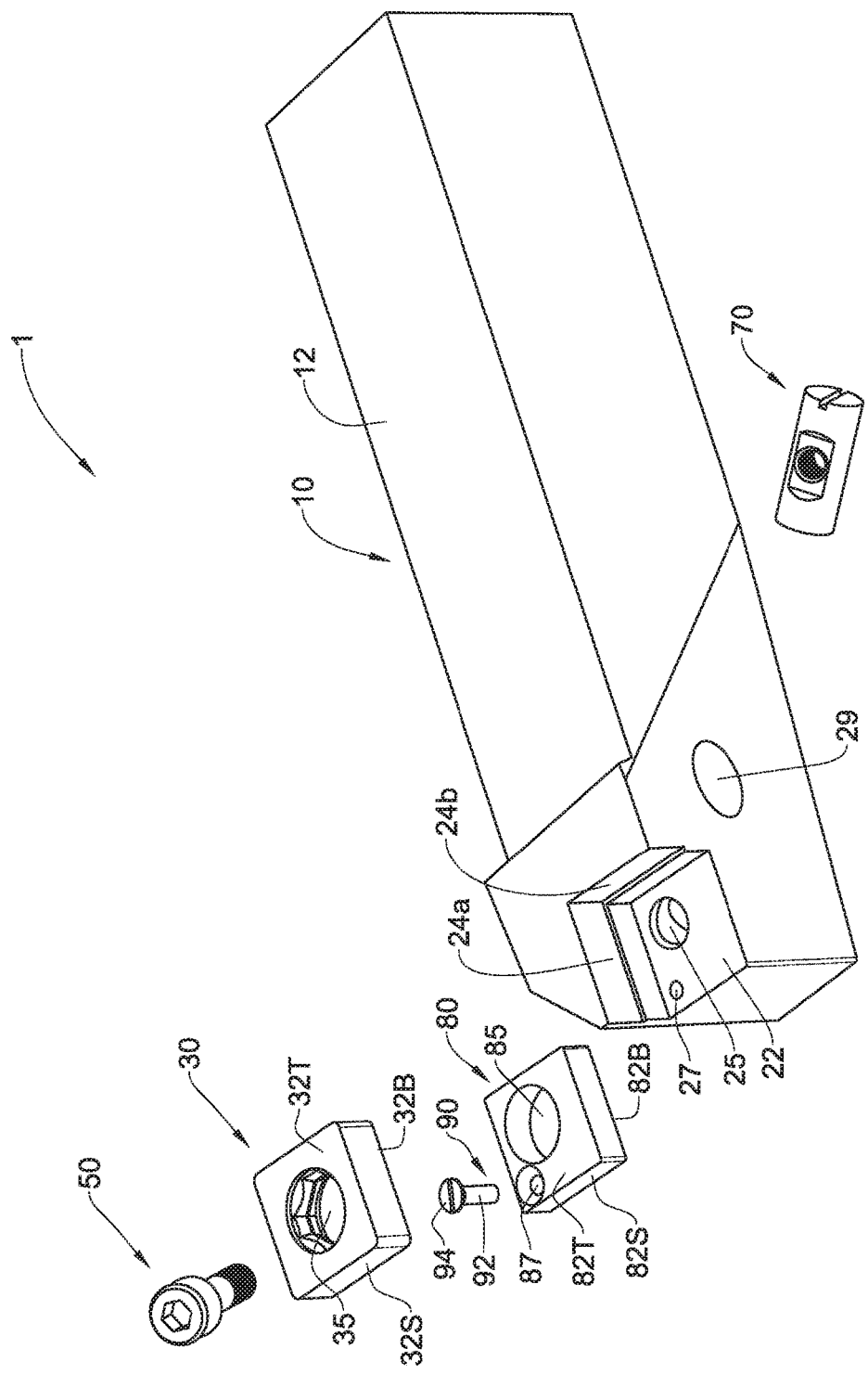

DYNAMIC CLAMPING MECHANISM

TECHNOLOGICAL FIELD

The subject matter of the present application is in the field of cutting tools, in particular, in the field of mounting and securing mechanisms of cutting inserts onto cutting tool holders.

BACKGROUND

A cutting tool is generally formed with at least one cutting edge, and is adapted for the removal of material from a workpiece by bringing the cutting edge into contact with the workpiece and displacing the cutting edge with respect to the workpiece either by displacing the cutting tool with respect to the workpiece or vise versa.

The cutting edges of cutting tools wear rapidly when used for cutting operations, particularly when cutting hard materials such as metal, and therefore they must be frequently replaced or re-sharpened. In many types of cutting tools, such as tools adapted for milling/drilling/turning machines, the cutting tool may comprise a plurality of cutting inserts, each being formed with at least one cutting edge, the inserts being fixed within seats of a cutting tool holder to form the cutting tool.

In a conventional cutting tool, the cutting insert is attached within the seat of the cutting tool by a fastener passing through a bore in the cutting insert into the bottom of the seat of the cutting tool. Indexing (or completely replacing) the cutting insert to enable the use of another cutting edge (or another insert altogether) requires the removal of the fastener, the reorientation or removal of the cutting insert, and the reattachment of the cutting insert within the seat of the cutting tool by the fastener. Each of these operations involves time and labor, and since cutting tools generally include a plurality of such cutting inserts, the time and labor costs involved in indexing the cutting inserts in a cutting tool are considerable.

In order to overcome technical problems, among which is the one presented above, alternative methods of mounting the cutting inserts onto the cutting tool holder have been devised as disclosed in WO2008/149371 to the applicant.

Other methods of fastening cutting inserts onto cutting tool holders include the use of clamps and lever mechanisms which are usually in the form of a mechanic assembly comprising at least one moving part configured for displacing so as to come into contact with a designated surface of the cutting insert and applying pressure thereto for the purpose of securing it. Examples of such arrangement are disclosed in U.S. Pat. No. 3,027,623A, 3,138,846A and others.

Additional examples include EP0037554, U.S. Pat. No. 3,341,919, 3,805,351, 3,913,197, 3,946,473 and 5,199,828, disclosing arrangements in which the fastening screw remains engaged with the tool holder during mounting/dismounting of the cutting insert.

Acknowledgement of the above references herein is not to be inferred as meaning that these are in any way relevant to the patentability of the presently disclosed subject matter.

GENERAL DESCRIPTION

According to a first aspect of the subject matter of the present application, there is provided 1. A cutting tool holder configured for mounting thereon a cutting insert to form a cutting tool, said cutting insert having a top face, a bottom face, at least one side wall extending between the top face and the bottom face, and an insert bore extending between the top face and the bottom face, said cutting tool holder comprising a body and a fastening member, said body comprising:

an insert seat having a base surface and being configured for receiving therein the cutting insert; and a seat bore having an open end at said base surface;

said fastening member defining a fastening member axis and comprising and shank portion and a head portion extending therealong, wherein:

said shank portion is configured for being received within said seat bore; and said head portion comprises a first clamping region, and a second clamping region axially spaced therefrom and disposed between the shank portion and the first clamping region;

wherein said fastening member is configured for assuming a mounting position in which said fastening member remains in engagement with the seat bore while allowing positioning of the cutting insert into the insert seat, and a securing position in which said first and second clamping regions are disposed so as to engage two axially-spaced regions of said cutting insert thereby securing it in the insert seat.

In accordance with another aspect of the subject matter of the present application, there is provided a cutting tool holder configured for mounting thereon a cutting insert to form a cutting tool, said cutting insert having a top face, a bottom face, at least one side wall extending between the top face and the bottom face, and an insert bore extending between the top face and the bottom face, said cutting tool holder comprising a body formed with an insert seat configured for receiving therein the cutting insert and a seat bore configured for accommodating therein a fastening member, said seat bore having an open end at said base surface and a seat bore axis, said holder also comprising an anchoring element received within the body of the holder configured for revolving about an anchoring axis oriented transverse to the seat bore axis, said holder also comprising a fastening member comprising a shank portion and a head portion extending along a fastening member axis, said shank portion being configured for secured engagement with said anchoring element and being free of such engagement with the seat bore allowing the fastening member to perform a pivot movement about the anchoring axis, wherein the head portion of said fastening member comprises a first clamping region and a second clamping region axially spaced from the first clamping region and being closer to the shank portion, said first clamping region and said second clamping region being configured for engaging two distinct, axially spaced regions of said cutting insert.

Under the above arrangement, when the fastening member is received within the seat bore, the first clamping region is elevated over the base surface to a greater degree than the second clamping region. In addition, the seat bore axis can be angled to the base surface of said insert seat at a positive angle so that when said fastening member is received within the seat bore, the first clamping region is disposed farther from the side walls than the second clamping region.

The insert bore of the cutting insert can be formed with an inner circumference comprising a first clamping surface and a second clamping surface axially spaced from the first clamping surface so that the first clamping surface is axially interposed between the top face of the cutting insert and the second clamping surface. Thus, in assembly, the second clamping surface is disposed closer to the base surface of the insert seat than the first clamping surface.

In assembly, the arrangement is such that the first clamping region of the fastening member is configured for engaging the first clamping surface of the cutting insert and the second clamping region of the fastening member is configured for engaging the second clamping surface of the cutting insert.

The cutting insert can be formed with a cutting edge defined at the intersection between the top face of the cutting insert and the at least one side wall thereof. In assembly, when the cutting insert is mounted onto the cutting tool holder so as to perform a cutting operation using said cutting edge, the engagement between the first clamping portion and the cutting insert takes place closer to the operative cutting corner of the cutting insert than the engagement between the second clamping portion and the cutting insert, and at a higher elevation over said base surface.

It should be understood that in accordance with both aspects of the subject matter of the present application presented above, the head portion of the fastening member is designed so as to allow a cutting insert to be mounted on and removed from the cutting tool holder over the head portion of the fastening member. In other words, the maximal diameter of the inscribing cylinder of the fastening member is always smaller than or equal to a maximal diameter of a cylinder inscribed within the insert bore.

The above arrangement allows retaining the fastening member within the cutting tool holder even in the mounting position, thereby eliminating the need for disengaging the fastening member from the cutting tool holder during mounting/dislodging operation of the cutting insert.

It is also appreciated that, on the one hand, the head portion should be smaller than the insert bore as described above in order to allow the above arrangement. On the other hand, the head portion should be able to apply downward pressure on the cutting insert in order to properly secure it to the insert seat. For this purpose, the fastening member of the subject matter of the present application provides the unique design under which the fastening member is oriented at an angle to the base surface and formed with two axially spaced clamping portions. While each of the clamping portions, on its own has an inscribing cylinder of a diameter smaller than the corresponding diameter of the insert bore, owing to the angled orientation of the fastening member, the perpendicular projection of the clamping portions allows applying pressure to two distinct, axially spaced and opposed regions of the cutting insert.

The first clamping region of the cutting insert can be oriented at a first clamping angle with respect to a central axis of the insert bore and the second clamping region of the cutting insert can be oriented at a second clamping angle with respect to a central axis of the insert bore, smaller than the first clamping angle. Under this arrangement, during fastening of the fastening member, the greater first clamping angle yields a sideways force vector on the head portion in a direction opposite the cutting corner, i.e. towards the side walls of the insert seat. This, in turn, leads to a more secure clamping of the cutting insert.

In accordance with another aspect of the subject matter of the present application there is provided a fastening member extending along a central axis and being configured for being received in a cutting tool holder to secure a cutting insert, said fastening member defining a fastening member axis and comprising a head portion and one or more stem portions extending along said axis, said head portion comprising a first clamping region and a second clamping region, the clamping regions having respective maximal diameters D1 and D2 measured along respective planes I and II oriented perpendicular to the fastening member axis, and wherein the distance between planes I and II does not exceed 50% of an overall axial length of the fastening member.

In accordance with several design embodiments, said axial distance does not exceed 45% of an overall axial length of the body of the fastening member, more particularly, said axial distance does not exceed 35% of an overall axial length of the body of the fastening member, even more particularly, said axial distance does not exceed 25% of an overall axial length of the body of the fastening member, and even more particularly, said axial distance does not exceed 10% of an overall axial length of the body of the fastening member.

Under a specific design embodiment, the entire length of the head portion (not merely the axial distance between maximal diameters) does not exceed the length discussed above.

In accordance with yet another aspect of the subject matter of the present application, there is provided a fastening member extending along a central axis and being configured for being received in a cutting tool holder to secure a cutting insert, said fastening member defining a fastening member axis and comprising a head portion and one or more stem portions extending along said axis, said head portion comprising a first clamping region and a second clamping region, the clamping regions having respective maximal diameters D1 and D2 measured along respective planes I and II oriented perpendicular to the fastening member axis, and wherein the maximal diameter of at least the first clamping region does not exceed the distance between planes I and II.

In particular, the maximal diameter of the first enlargement does not exceed 66% of the axial distance between the maximal diameter of the first securing enlargement and the maximal diameter of the second securing enlargement, more particularly, it does not exceed 50% of the axial distance between the maximal diameter of the first securing enlargement and the maximal diameter of the second securing enlargement, and even more particularly, it does not exceed 40% of the axial distance between the maximal diameter of the first securing enlargement and the maximal diameter of the second securing enlargement.

In accordance with yet another aspect of the subject matter of the present application there is provided a cutting insert to be used with the cutting tool holder and fastening member of the previous aspects of the present application.

The cutting insert can comprise a top face, a bottom face, at least one side wall extending between the top face and the bottom face, and an insert bore extending between the top face and the bottom face. The cutting insert can be formed with at least one cutting edge defined at the intersection between the top face of the cutting insert and the at least one side wall thereof.

The insert bore of the cutting insert can be formed with an inner circumference comprising a first clamping surface disposed closer to the top face of the cutting insert and a second clamping surface axially spaced from the first clamping surface and disposed closer to the bottom face of the cutting insert. Specifically, the first clamping surface can be angled to the second clamping surface.

Thus, when the cutting insert is mounted onto the tool holder, the second clamping surface is disposed closer to the base surface of the insert seat than the first clamping surface.

The arrangement can be such that in securing of the cutting insert, the first clamping surface of the cutting insert is configured for engaging the first clamping region of the fastening member and the second clamping surface of the cutting insert is configured for engaging the second clamping region of the fastening member.

The insert bore can have a clamping surface extending inwardly from an inner surface of the insert bore, at an acute angle to the inner surface. The clamping surface can extend circumferentially, such that an intersection line between said clamping surface and said inner surface is located in proximity to a mid point between the top face and the bottom face of the cutting insert.

In accordance with a particular example, the cutting insert can comprise a first clamping zone and a second clamping zone, and wherein the first clamping zone is constituted by a first clamping surface and a second clamping surface spaced from the first clamping surface.

Thus, when the cutting insert is secured within the holder, the fastening member comes into contact with the cutting insert at least at three points: a first contact point on the second clamping zone, and a second and a third contact point on each of the first and second clamping surfaces of the first clamping zone.

According to a specific design embodiment, the first clamping surface and of the second clamping surface is a curved surface. More particularly, at least one of the first clamping surface and of the second clamping surface is convex towards a top surface of the cutting insert. The space between the first clamping surface and the second clamping surface can be disposed along a diagonal bisector extending from an operative corner of the cutting insert.

The arrangement can be such that when the cutting insert is mounted onto the cutting tool holder so as to perform a cutting operation using said cutting edge, the engagement between the first clamping portion and the cutting insert takes place closer to an operative cutting corner of the cutting insert comprising said cutting edge than the engagement between the second clamping portion and the cutting insert, and at a higher elevation over said base surface.

In accordance with still another aspect of the subject matter of the present application there is provided a cutting tool comprising the cutting tool holder, cutting insert and fastening member of the previous aspects of the present application.

The arrangement can be such that each of the maximal diameters of the fastening portions of the fastening member does not exceed the minimal diameter of the insert bore of the cutting insert, thereby allowing the cutting insert to be mounted on and removed from the cutting tool holder over the head portion of the fastening member.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1 is a schematic exploded isometric view of a turning tool comprising a clamping mechanism according to the subject matter of the present application;

DETAILED DESCRIPTION OF EMBODIMENTS

Figure 2A:
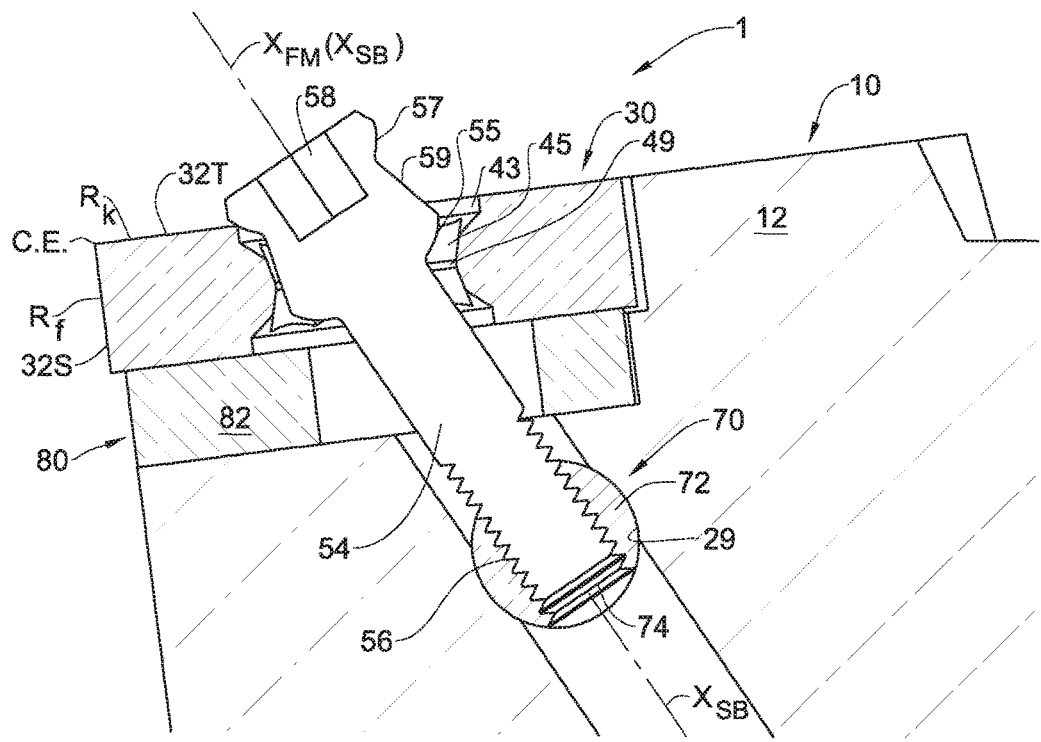
FIG. 2A is a schematic section-view of the turning tool shown in FIG. 1, shown at a mounting position thereof.

Attention is first drawn to FIG. 1, in which a turning tool is shown generally designated as 1, and comprising a tool holder 10 formed with an insert seat 20, a cutting insert 30 mounted onto the tool holder 10, a fastening member 50, an anchoring member 70 and a support plate 80 with a screw 90.

The tool holder comprises a main body 12 and the seat 20 is a space configured for accommodating the cutting insert 30, the space being defined between a base surface 22 and two side walls 24a, 24b angled to the base surface 22 and to each other. In addition, the too holder 10 comprises a seat bore 25 having an open end at the base surface 22, and an anchoring channel 29 transverse to the seat bore 25, which is configured for accommodating therein the anchoring member 70.

In assembly, the anchoring member 70 is inserted into the anchoring channel 29 to be accommodated therein in a rotational manner, and is thereafter rotationally aligned so that a corresponding anchoring bore 74 of the anchoring member 70 is aligned with the insert bore 25. In this position, the fastening member 50 can be inserted into the seat bore 25, so that a threaded tip of the fastening member 50 is screwed into the corresponding anchoring bore 74.

In the position above, the fastening member 50 can still perform a slight pivotal movement owing to the wide dimensions of the seat bore 25, which are greater than the diameter of a stem of the fastening member 50.

Further in assembly, the support plate 80 is placed onto the insert seat 20, so that a bottom face 82B of the support plate 80 lies on the base surface 22, and is then secured to the seat using the screw 90 via a designated opening 87, and matching auxiliary bore 27 of the seat 20. In this position, a head of the fastening member 50 protrudes from the support plate 80.

Thereafter, the cutting insert 30 can be placed onto the support plate 80 and be removed therefrom, over the head portion of the fastening member 50, allowing mounting and dislodging of the cutting insert 30 without removing the fastening member 50 from the tool holder 10.

Figure 2B:
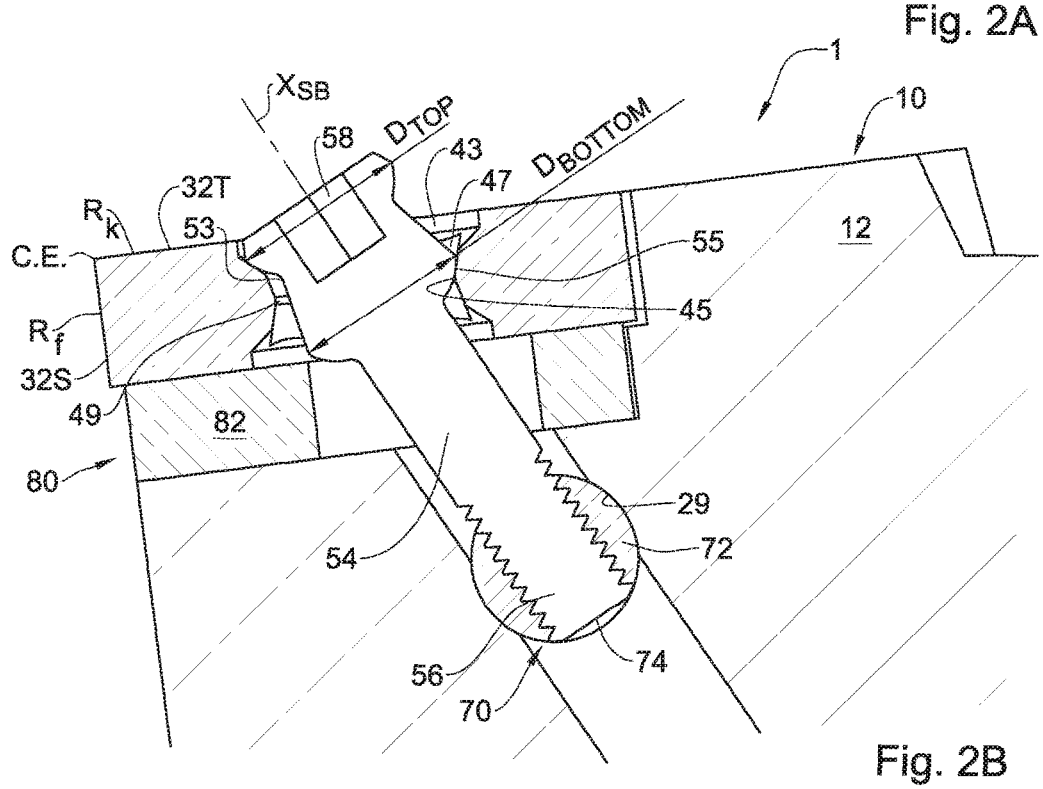
FIG. 2B is a schematic section-view of the turning tool shown in FIG. 1, shown at a securing position thereof.
Figure 2C:
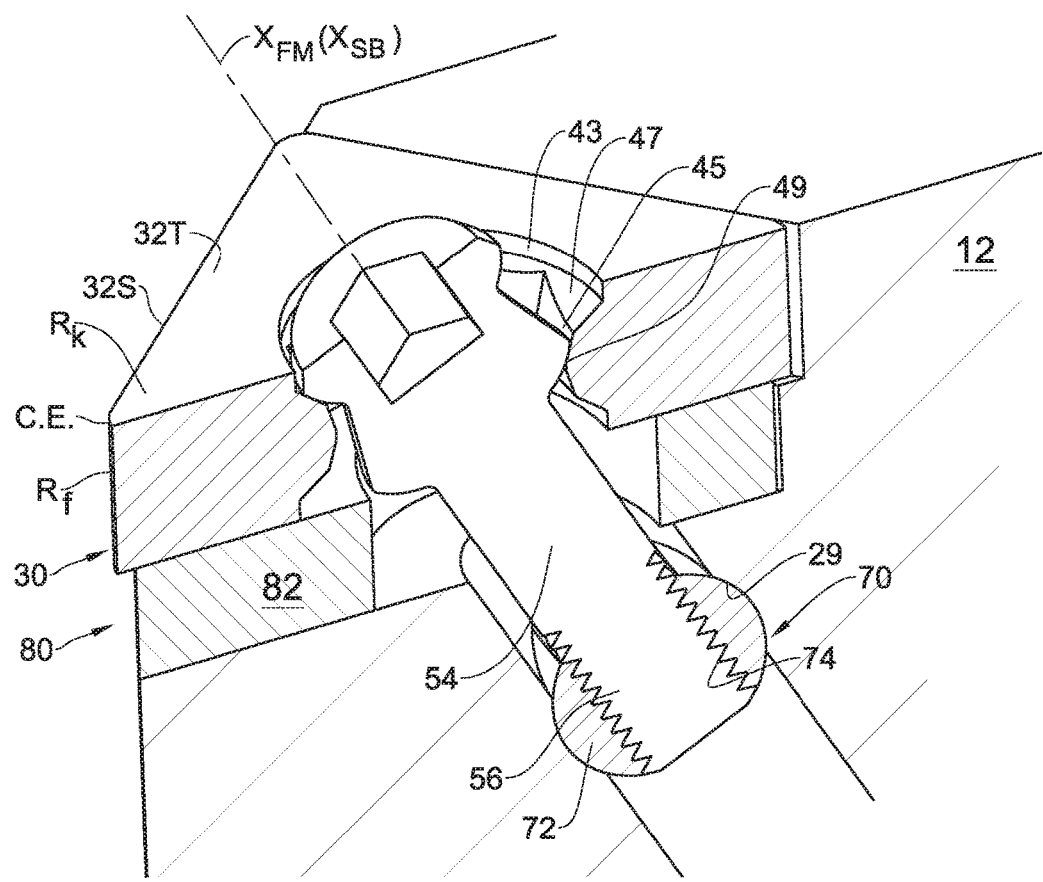
FIG. 2C is a schematic isometric section-view of the turning tool shown in FIG. 2B.

Further attention is now drawn to FIGS. 2A to 2C, in which two different states of the cutting insert 30 are shown, reflected by two different positions of the fastening member 50.

In particular, as shown in FIG. 2A, the cutting insert 30 has been placed in its proper position (as would be in its securing position) over the head portion 51 of the fastening member 50, so that a bottom face 32B of the insert 30 is mated with a top face 82T of the support plate 80. In this position, the fastening member 50 is not yet fastened, so the cutting insert 30, although being in it final position, is not yet secured, and the head portion 51 of the fastening member 50 is not in contact with the insert bore 35 of the cutting insert 30.

As shown in FIG. 2B, the fastening member 50 has been fastened by way of threading it deeper into the seat bore 25 (owing to the engagement with the anchoring member 70), whereby the head portion of the fastening member 50 engage the inner surface of the insert bore 35. Specifically, a first fastening portion 57 of the fastening member 50 comes into contact with a first fastening surface 47 of the insert bore 35, and a second fastening portion 55 of the fastening member 50 comes into contact with a first fastening surface 45 of the insert bore 35.

The design of the fastening portions 55, 57 is such that there is formed a neck 53 between them, forming a space into which a portion 49 of the inner surface of the cutting insert 30 protrudes. This provides the fastening member with enough space to change it orientation during securing as will be explained in detail later.

Figure 7A:
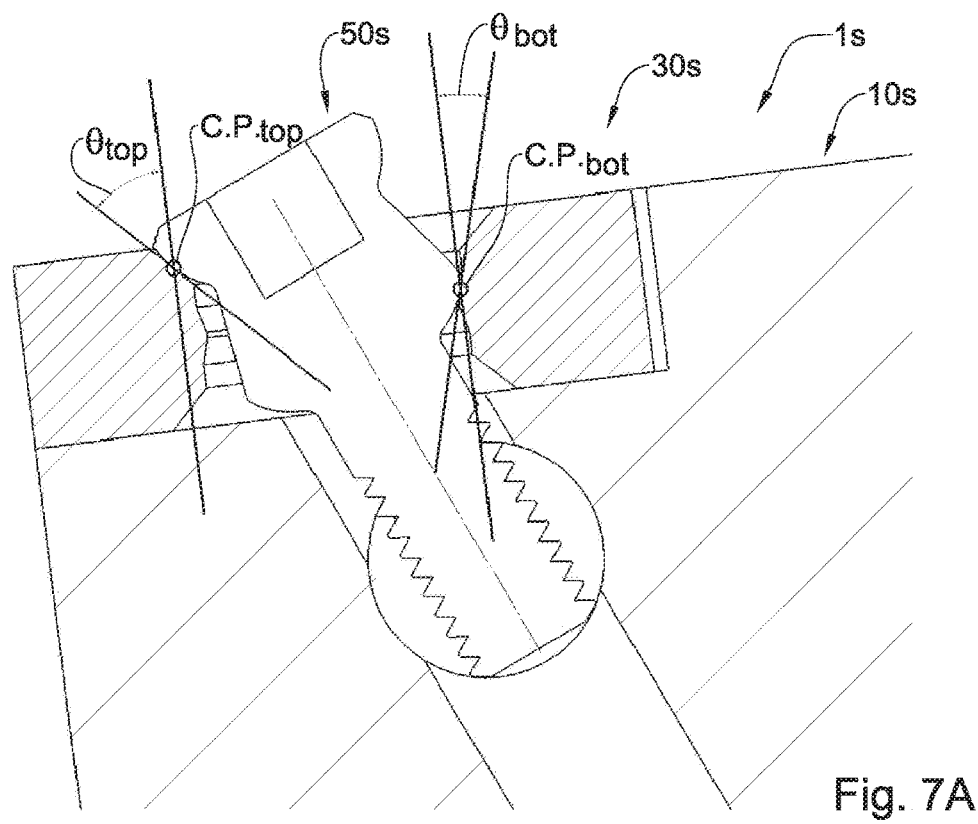
FIGS. 7A to 7C are schematic section views of an exemplary turning tool with a clamping mechanism according to the subject matter of the present application, demonstrating geometry and basic design principles.
Figure 7B:
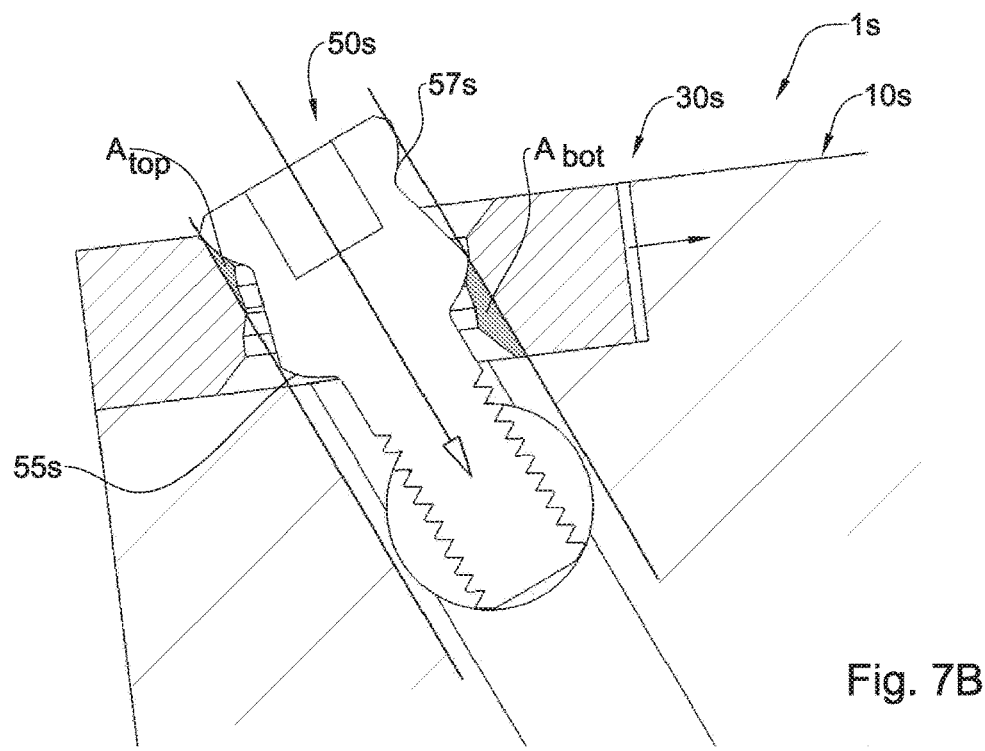
Figure 7C:
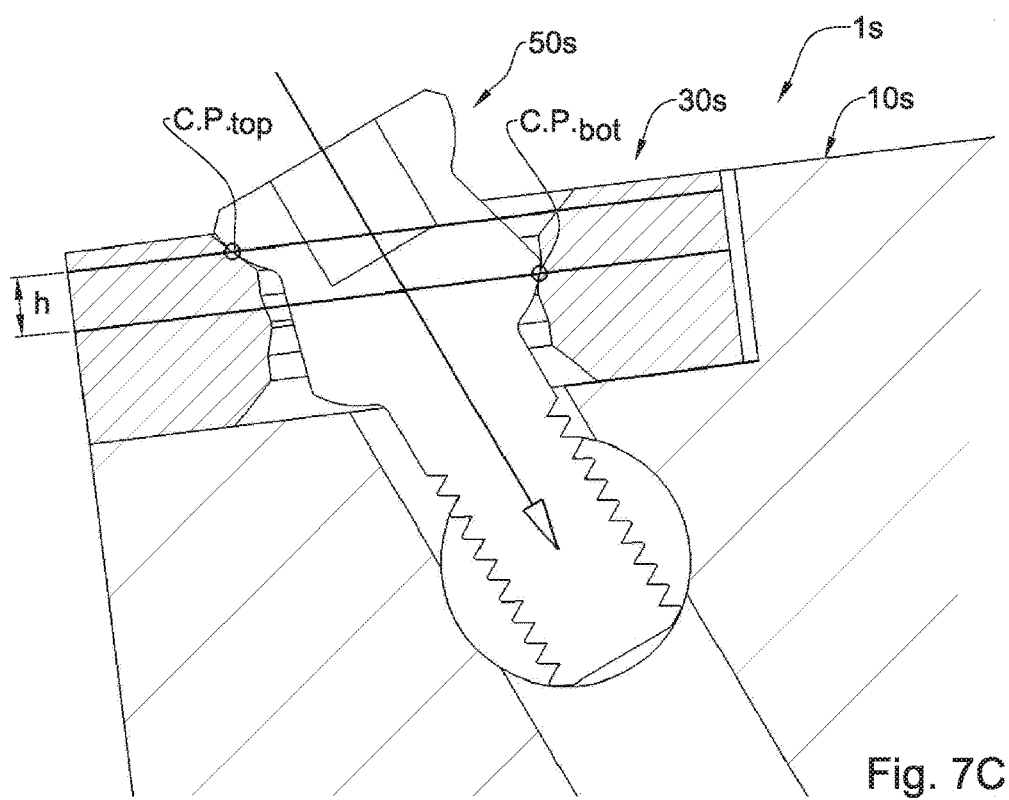

It is observed that in the secured position shown in FIG. 2B, the engagement with the first fastening surface 47 takes place at a greater elevation over the base surface 22, and closer to the cutting edge C.E. of the cutting insert 30 than the engagement with the second fastening surface 45 (see FIG. 7C).

Figure 4:
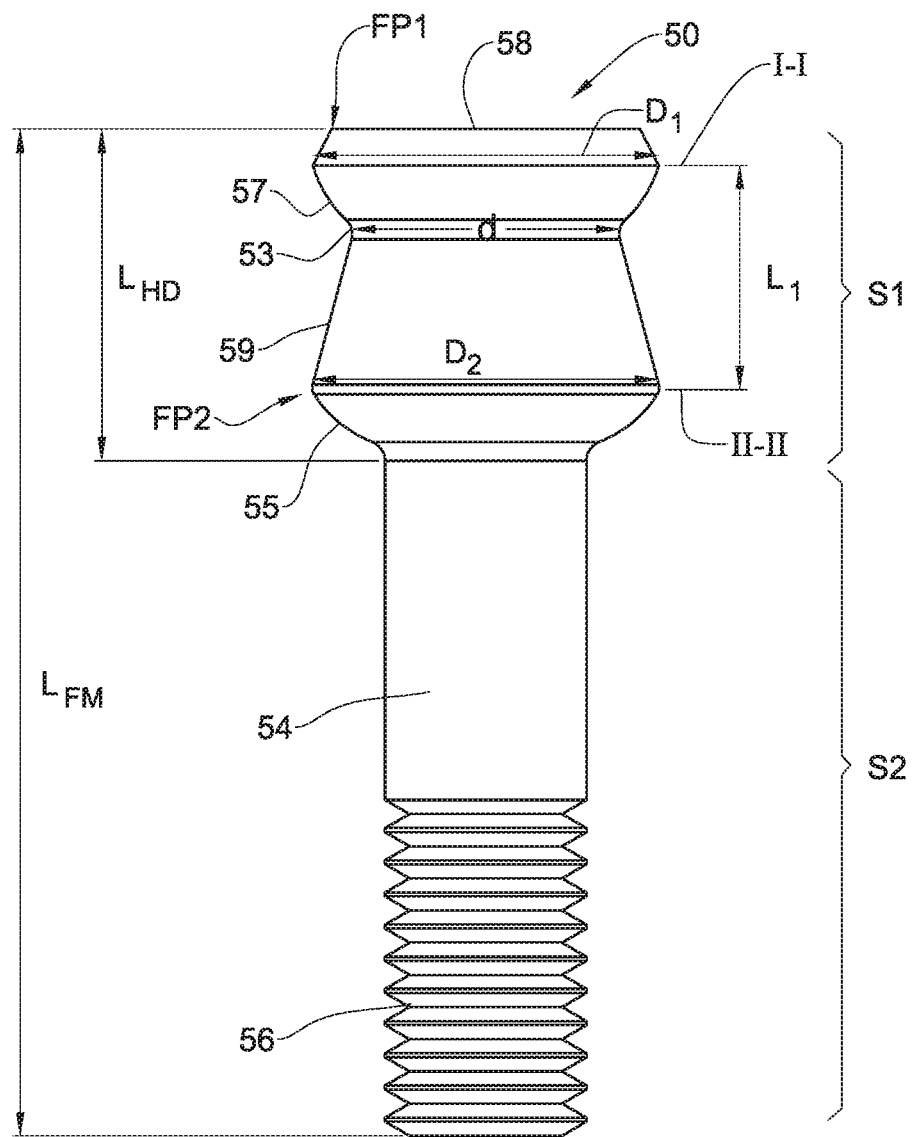
FIG. 4 is a schematic front view of a fastening member used in the turning tool shown in FIG. 1.
Figure 5A:
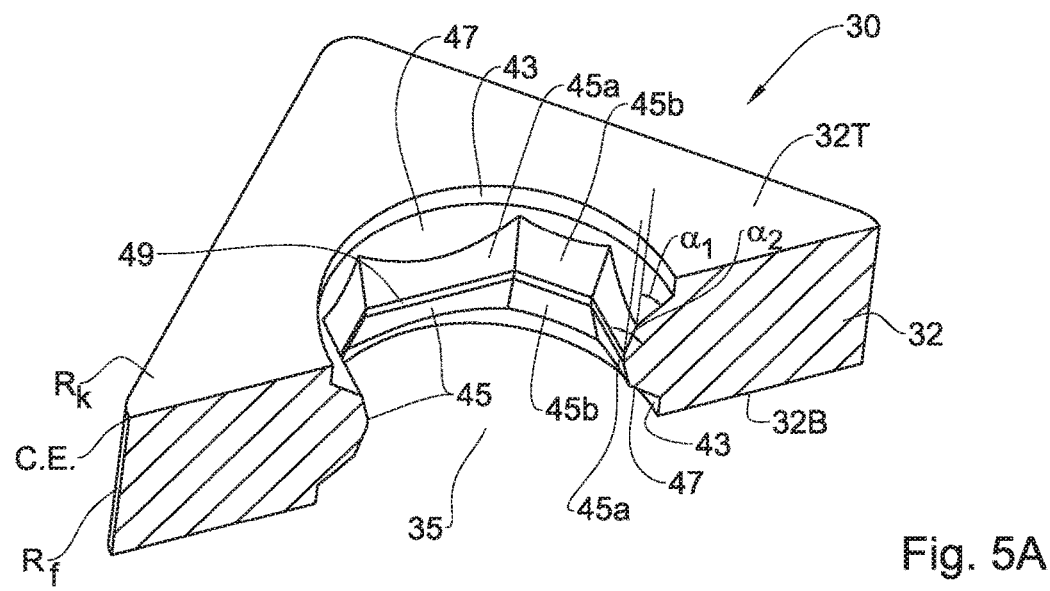
FIG. 5A is a schematic isometric section view of a cutting insert used in the turning tool shown in FIG. 1.
Figure 5B:
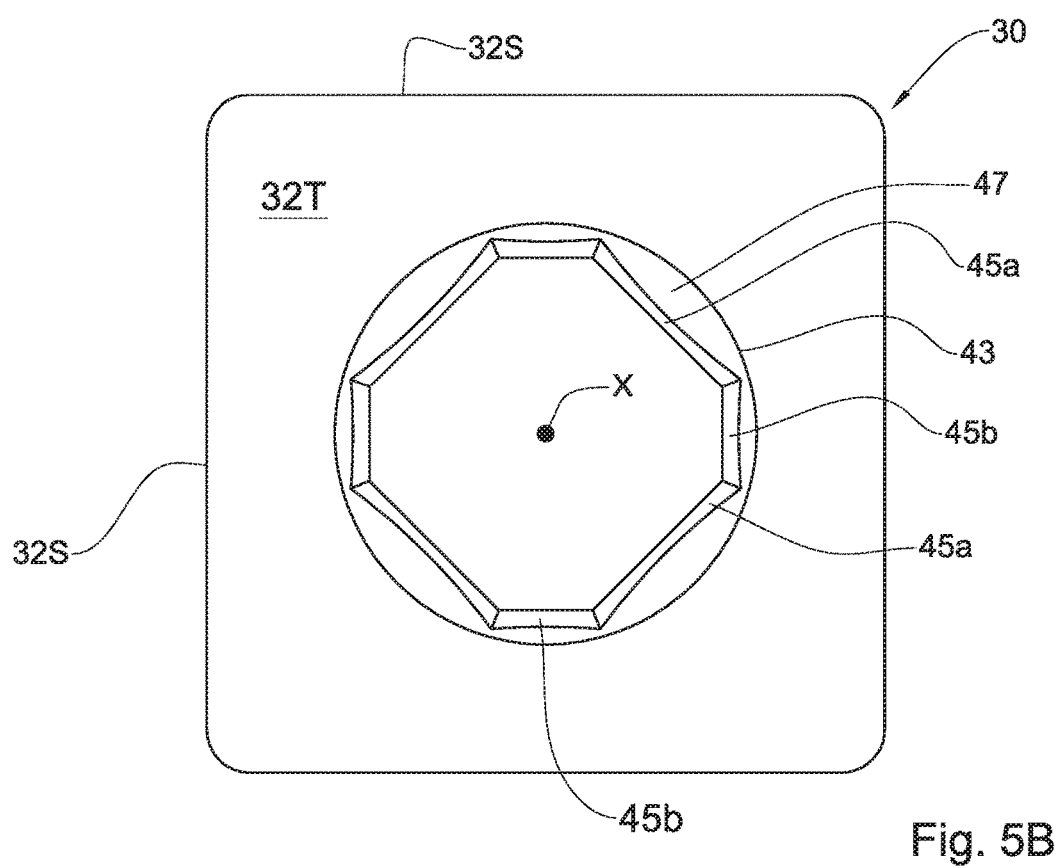
FIG. 5B is a schematic top view of the cutting insert shown in FIG. 5A.

Additional reference is not being drawn to FIGS. 4 to 5B, in which the fastening member 50 and the cutting insert 30 are separately shown.

The fastening member 50 comprises a head portion 51 and a shank portion 52. The head portion 51 is formed with a first fastening portion FP1 and a second fastening portion FP2, which is disposed between the first fastening portion FP1 and the shank portion 52. Each of the fastening portions FP1, FP2 comprises a corresponding fastening surface 57 and 55 respectively. In addition, the first fastening portion FP1 is also provided with port 58 for introduction of a fastening tool such as a screwdriver.

The shank portion has a non-threaded segment 54 and a threaded segment 56, so that the non-threaded segment 54 is interposed between the threaded segment 56 and the second fastening portion FP2.

Turning to the cutting insert 30, it has a main body 32 extending between a top face 32T and a bottom face 32B, with four side faces 32S extending therebetween. The cutting insert 30 is of symmetric design about a mid-plane (not shown) extending between the top face 32T and the bottom face 32B, and therefore only a top half of the cutting insert 30 will be discussed, taking into account that the opposite half is a mirror image thereof.

The cutting insert 30 is formed with an insert bore 35, comprising an inner circumference defined by a plurality of surfaces. The insert bore 35 has a first fastening surface 47, sloping from the top face 32T as a chamfer surface. The first fastening surface extents radially 360° about an axis X of the cutting insert.

In addition, the insert bore 35 is provided with an irregular octagonal arrangement of second fastening surfaces 45a, 45b, the geometry of which can be viewed as a frustum square, i.e. a square which corners have been cut. This gives rise to an alternating set of second fastening surfaces 45a, 45b, 45a etc.

Thereafter, the inner circumference of the insert bore 35 is provided with an intermediary strip 49, also of a similar octagonal design.

It is appreciated that the slope angle $\alpha_1$ of the first fastening surface 47 with respect to the axis X of the cutting insert is greater than the slope angle $\alpha_2$ of the second fastening surface 47 with respect to the axis X, and that the intermediary strip 49 is parallel to the axis X.

Reverting now to FIG. 2B, in the securing position, the first fastening surface 57 of the fastening member 50 presses down on the sloped first fastening surface 47 of the cutting insert 30, and the second fastening surface 55 of the fastening member 50 presses down on the sloped second fastening surface 45 of the cutting insert 30. This provides a first downward force which is applied both at the area of the cutting edge C.E. by the first fastening portion FP1, and at the rear area of the cutting insert 30 by the second fastening portion FP2.

It is noted that the maximal diameter of each of the fastening portions FP1, FP2 of the fastening member 50 does not exceed the maximal diameter of the narrowest part of the insert bore 35. Thus, when the axis of the insert bore 35 and the axis of the fastening member 50 are aligned, the cutting insert 30 can be placed onto or removed from the insert seat over the head portion 51 of the fastening member 50.

Figures 2D, 2E, 2F:
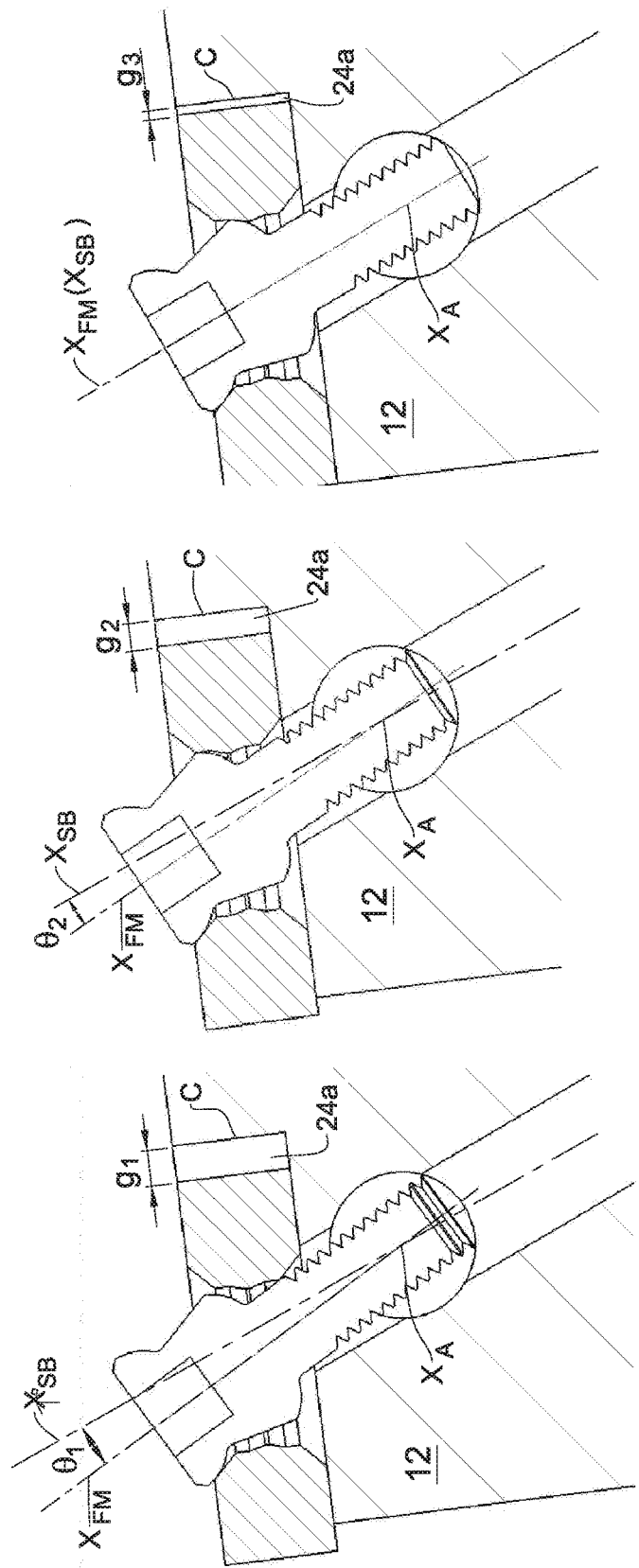
FIGS. 2D to 2F are schematic section views of the turning tool shown in FIG. 1, during three consecutive stages between the mounting position and the securing position.

Attention is now drawn to FIGS. 2D to 2F, which illustrate how the operation of the fastening member 50 can also facilitate displacement of the cutting insert 30 into its final, secured position. Specifically, whereas in the previous examples the cutting insert 30 was placed in its final position and merely secured by tightening the fastening member 50, in the present example, fastening of the member 50 entails displacement of the cutting insert 50.

Starting with the position shown in FIG. 2D, the cutting insert 30 is not in its final position, and is considerably remove from the corner C between the side walls 24a, 24b. In this position, the fastening member 50 is tilted together with the anchoring member 70 so that the axis $X_{FM}$ of the fastening member 50 is at an angle $\theta_1$ with respect to the axis $X_{SB}$ of the seat bore 25. In this state, the first fastening portion FP1 of the fastening member 50 rests on the first fastening surface 47, and the second fastening portion FP2 is out of contact with the cutting insert 30.

Turning now to FIG. 2E, when the fastening member 50 is tightened by threading it into the anchoring member 70, the distance between the head portion 51 and the base surface 22 decreases, and owing to the engagement of FP1, the fastening member 50 begins tilting CW about its pivot axis $X_A$, so that the angle with respect to the seat bore axis $X_{SB}$ is now $\theta_2 < \theta_1$. Simultaneously, this brings to contact between the second fastening portion FP2 with the second fastening surface 47, causing sliding of the cutting insert 30 towards the corner C.

The fastening member 50 acts on the cutting insert 30 in two different locations thereof (fastening surfaces 47 and 45 respectively), thereby yielding a triple effect resulting from the slope of the surfaces and the angle of the seat bore:
 a) engagement between FP1 and the surface 47 urges CW rotation of the fastening member 50 about $X_A$;
 b) engagement between FP2 and the surface 45 urges CCW rotation of the fastening member 50 about $X_A$; and
 c) the angle of the seat bore 25 urges the cutting insert 30 to displace towards the corner.

It is appreciated that (a) facilitates FP2 coming into contact with surface 45, while (b) facilitates FP1 coming into contact with surface 47. This ensures that the fastening member 50 is always in engagement with both surfaces 47 and 45, and that it secures the cutting insert 30 in two separate locations, while simultaneously driving the cutting insert 30 towards the corner C.

As shown in FIG. 2F, eventually, the cutting insert 30 comes into contact with the side walls 24a, 24b, and cannot be further displaced. Thereafter, tightening of the fastening member 50 simply increases pressure on the cutting insert 30. It should also be appreciated that the pressure is uniformly distributed between the two different surfaces 47, 45, owing to the complementary effects (a) and (b). In other words, since pressure applied to surface 47 will be converted to CW rotation and pressure applied to surface 45 will be converted to CCW rotation, actual downward pressure on the cutting insert 30 can be provided only when both portions FP1 and FP2 are in first engagement with their respective surfaces 47, 45.

The above displacement of the fastening member 50 during its progression from the mounting position to the securing position provides for a self-adjusting alignment mechanism owing to the engagement with anchor member 70. Specifically, the fastening member 50 is free to shift its orientation subject to the movement of the cutting insert 30, thereby keeping the fastening member in contact with the surfaces of the cutting insert 30 for securing it in place.

As will be discussed in further examples, the self-adjustment feature can operate with different anchor members (rotational, lateral, axial), but all provide the fastening member with the degree of freedom required for properly engaging the cutting insert. It is appreciated that a different kind of degree of freedom can also be provided in cases where the fastening member is threaded directly to the body (e.g. as in FIGS. 6A to 6C), but such a degree of freedom relies on the elasticity of the fastening member and on its bending.

Figure 3A:
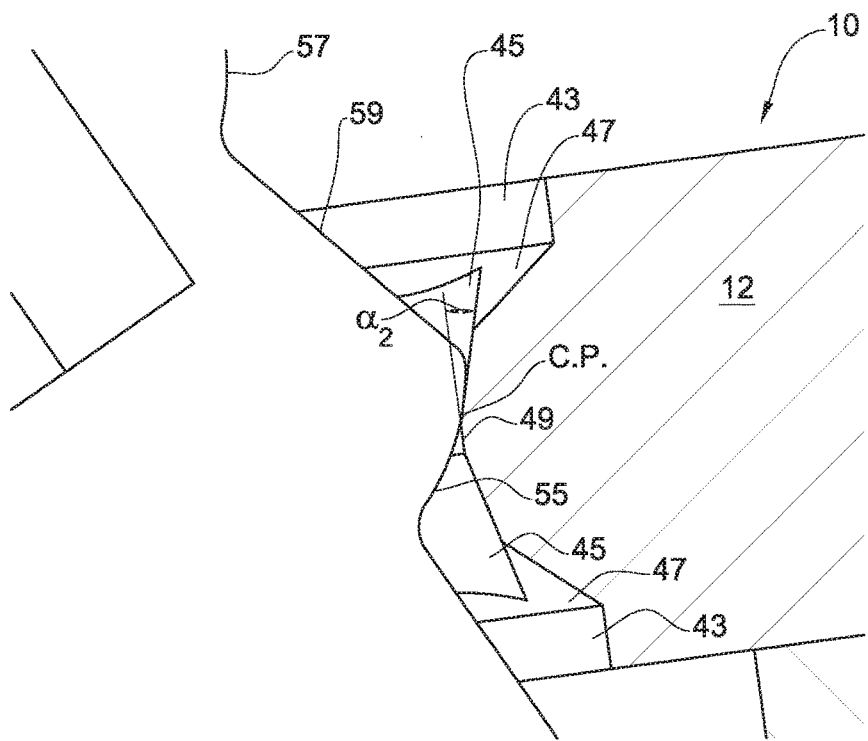
FIGS. 3A and 3B are schematic enlarged views of portions of the turning tool shown in FIG. 2B.
Figure 3B:
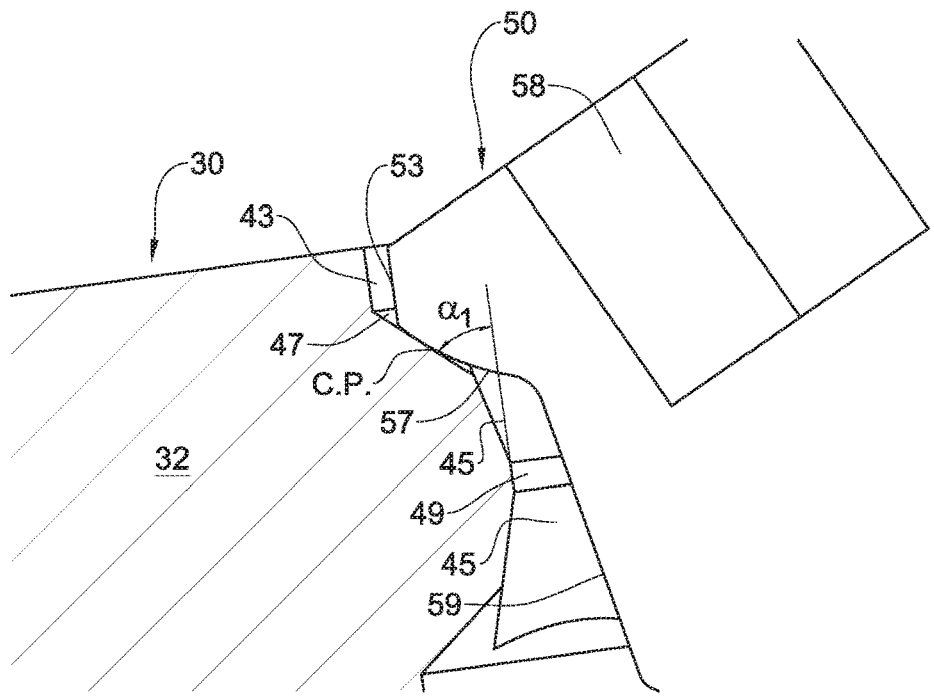

With additional reference being made to FIGS. 3A and 3B, the angles $\alpha_1$ (approx. 45°) and $\alpha_2$ (approx. 15°) are arranged so that there is more urging of the fastening member 50 to perform a CW rotation, thereby facilitating its ability to urging the cutting insert 30 towards the corner C of the insert seat 20.

With further reference to FIGS. 7A to 7C, several principles of the design of the subject matter of the present application are demonstrated:
 the greater angle of the engagement between FP1 (surface 57) and fastening surface 47 (45° vs. 15°);
 the portion FP2 applies pressure against a greater amount of solid material $A_{bottom}$ than the portion FP1 $A_{top}$. This provides firmer securing of the cutting insert 30 onto the insert seat 20; and
 the engagement between FP1 and the cutting insert 30 takes place higher and closer to the cutting edge C.E. than the engagement between FP2 and the cutting insert 30.

Figure 6A:
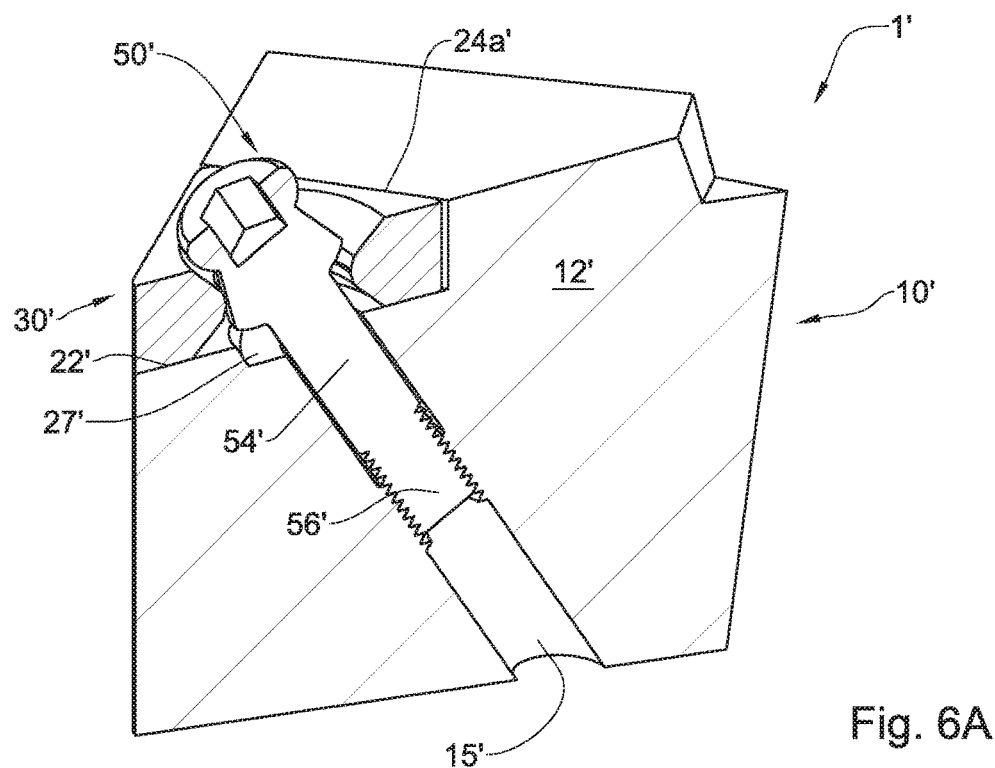
FIG. 6A is a schematic isometric section-view of another example of a turning tool according to the subject matter of the present application.
Figure 6B:
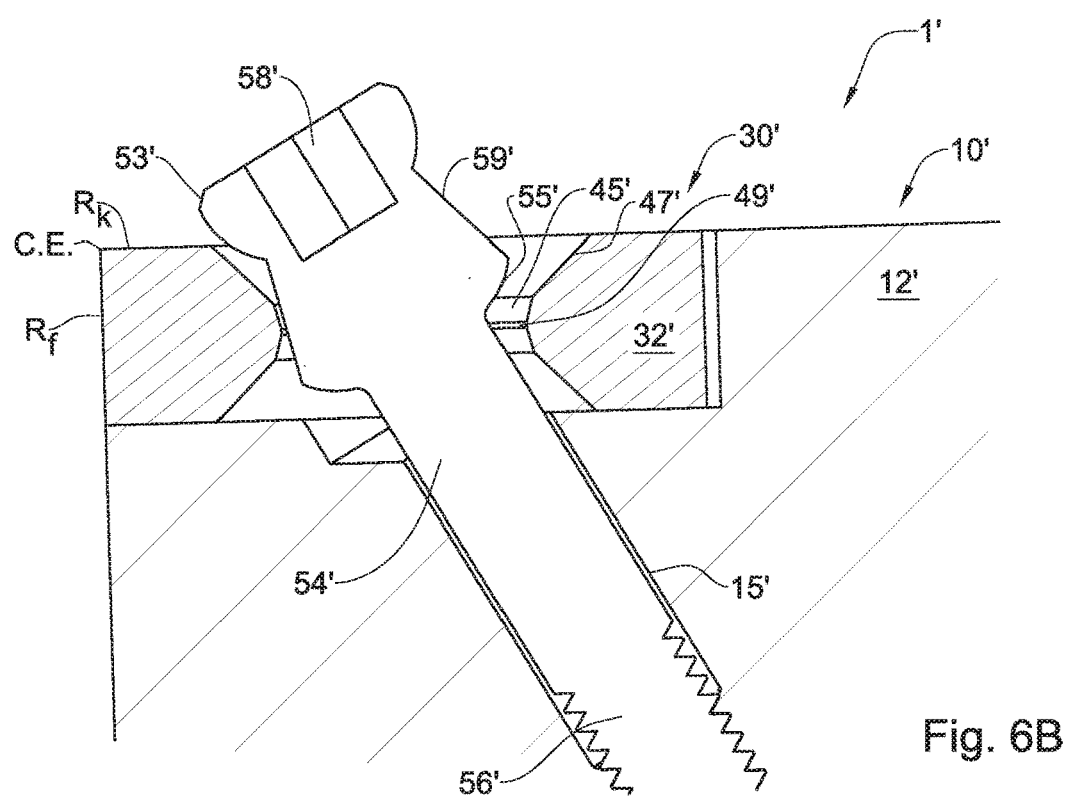
FIG. 6B is a schematic section-view of the turning tool shown in FIG. 6A, shown at a mounting position thereof.
Figure 6C:
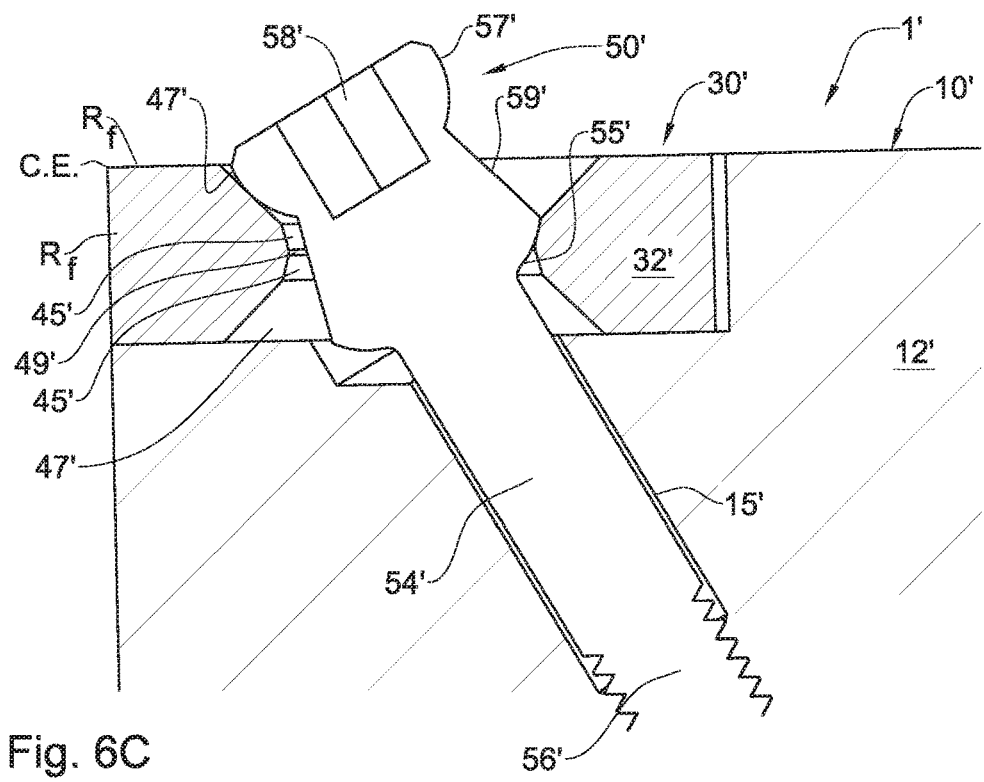
FIG. 6C is a schematic section-view of the turning tool shown in FIG. 6A, shown at a securing position thereof.

Turning now to FIGS. 6A to 6C, another example of a turning tool is shown, generally designated 1' and comprising a tool holder 10' formed with an insert seat 20', a cutting insert 30' mounted onto the tool holder 10', and a fastening member 50' configured for securing the cutting insert 30' into place.

Similar elements of the turning tool 1' are marked with the same designation number with the addition of ('), so that fastening member 50' is equivalent to fastening member 50, holder 10' is equivalent to holder 10 etc.

The main different between the turning tool 1 and the turning tool 1' lies in the fact that turning tool 1' does not comprise an anchoring member and the fastening member 50 is not allowed to pivot. The seat bore 25' is designed to firmly accommodate the fastening member 50' and is oriented at an angle corresponding to the final position of the cutting insert 30' on the tool holder 10'.

Instead of relying on a pivotal movement of the fastening member 50' as in the previous example, the current design embodiment relies on the elasticity of the fastening member in order to perform functions (a) and (b) as discussed above. However, these functions, instead of being constituted by rotational movement now are constituted by elastic deformation of the fastening member about a point (not shown) along its shank.

The assembly and operation of the turning tool holder 1' are essentially similar to those of turning tool 1. Specifically, the tool holder 10' comprises a main body 12' and the seat 20' is a space configured for accommodating the cutting insert 30', the space being defined between a base surface 22' and two side walls 24a', 24b' angled to the base surface 22' and to each other. In addition, the too holder 10' comprises a seat bore 25' having an open end at the base surface 22".

In assembly, the fastening member 50' is inserted into the seat bore 25', so that a threaded tip of the fastening member 50' is screwed into the corresponding anchoring portion of the seat bore 25'.

Thereafter, the cutting insert 30' can be placed onto the insert seat 20', over the head portion of the fastening member 50', allowing mounting and dislodging of the cutting insert 30' without removing the fastening member 50' from the tool holder 10'.

Reverting back to FIG. 4, it is observed that the fastening member 50 has a first maximal diameter D1 of FP1 and a second maximal diameter D2 of FP2, and the overall length of the fastening member 50 is $L_{FM}$. The diameters are taken along reference planes I and II respectively.

The arrangement is such that the distance L1 between D1 and D2 does not exceed 50% of $L_{FM}$. Moreover, the overall length of the head portion $L_{HP}$ does not exceed 50% of $L_{FM}$.

In addition, the distance between D1 and D2 is also interrelated with the value of D1 and D2, so that the distance L1 is smaller that at least the diameter D1.

It is appreciated that this design of the fastening member 50 allows it to properly engage the cutting insert 30 during assembly of the turning tool 1 (a cutting insert 30' in assembly of turning tool 1'), so that the head portion engages two location within the same insert bore. This is contrary to known examples in which fastening members are formed with two or more enlargements which are designed to be sufficiently spaced apart so that one enlargement engages the cutting insert and the other/s engage the tool holder.

Figure 8A:
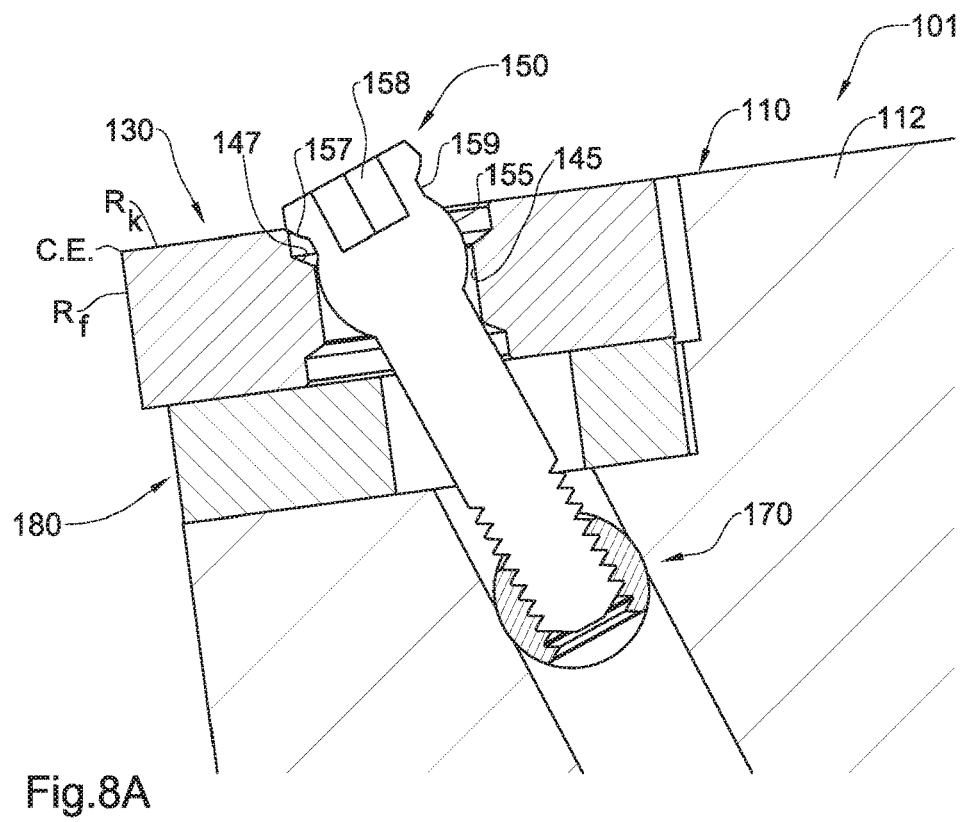
FIGS. 8A and 8B are schematic section-views of a turning tool according to another example of the present application, shown at a mounting position and a securing position thereof respectively.
Figure 8B:
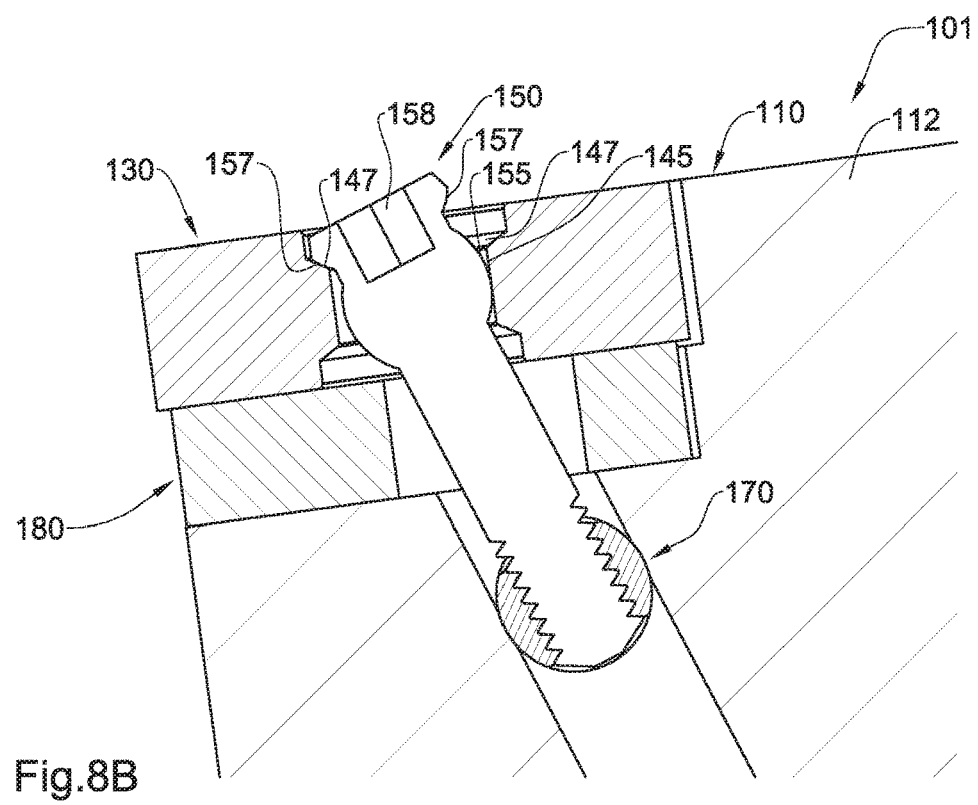

Attention is now drawn to FIGS. 8A and 8B, in which another example of a turning tool is shown, generally designates 101, and comprising a holder 110, a cutting insert 130, a support 180, a fastening member 150 and an anchoring mechanism 170. Elements similar to those of the turning tool shown in FIGS. 1 to 7B are designated by the same reference numbers, only upped by 100, e.g. fastening member 150 of the present example and fastening member 50 of the previous example are variants of one another, etc.

In the present example, the fastening member 150 also comprises a first fastening portion 157 and a second fastening portion 155 configured for engaging corresponding inner surfaces 145 and 147 of the cutting insert 130.

However, contrary to the previously described example, the fastening member 150 applies downward pressure on the cutting insert only on the side closer to the cutting edge C.E., i.e. via surface 147. On the opposite portion of the inner surface 40 of the bore 35 of the cutting insert 130, the second fastening portion 155 applies a sideways pressure, due to the orientation of the surface 145.

In all other aspects, operation of the clamping mechanism of the turning tool 101 is similar to that described in previous examples with respect to the turning tool 1.

Figure 9A:
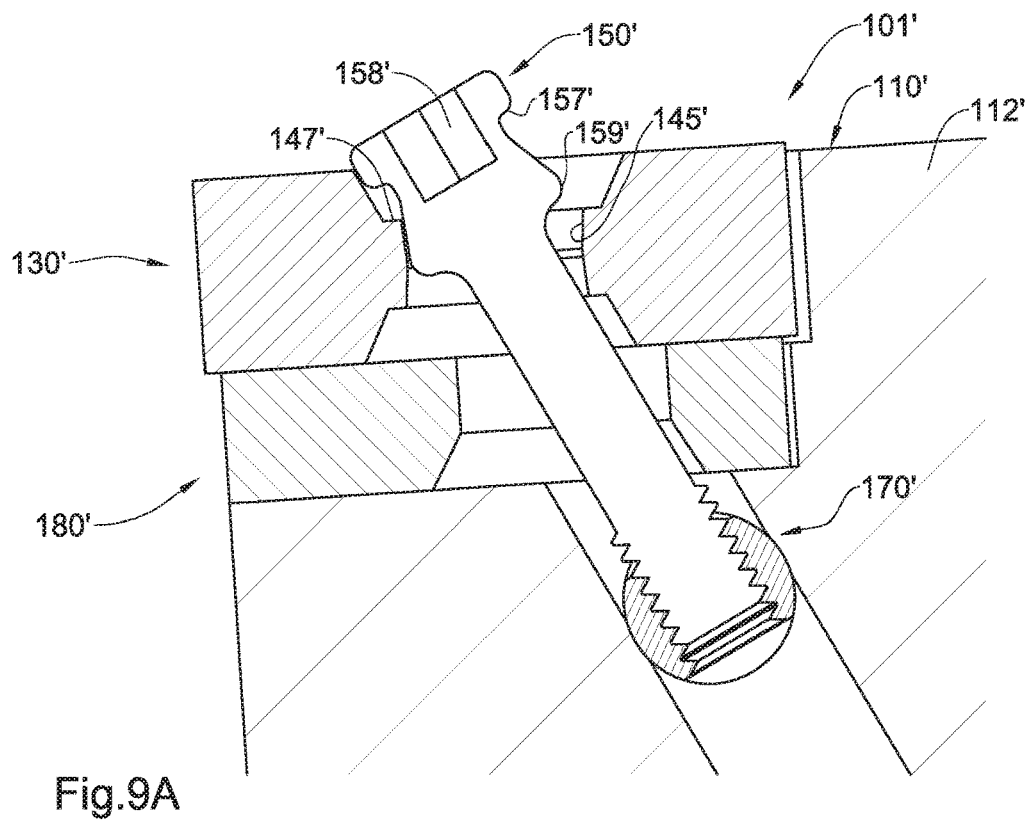
FIGS. 9A and 9B are schematic section-views of a turning tool according to another example of the present application, shown at a mounting position and a securing position thereof respectively.
Figure 9B:
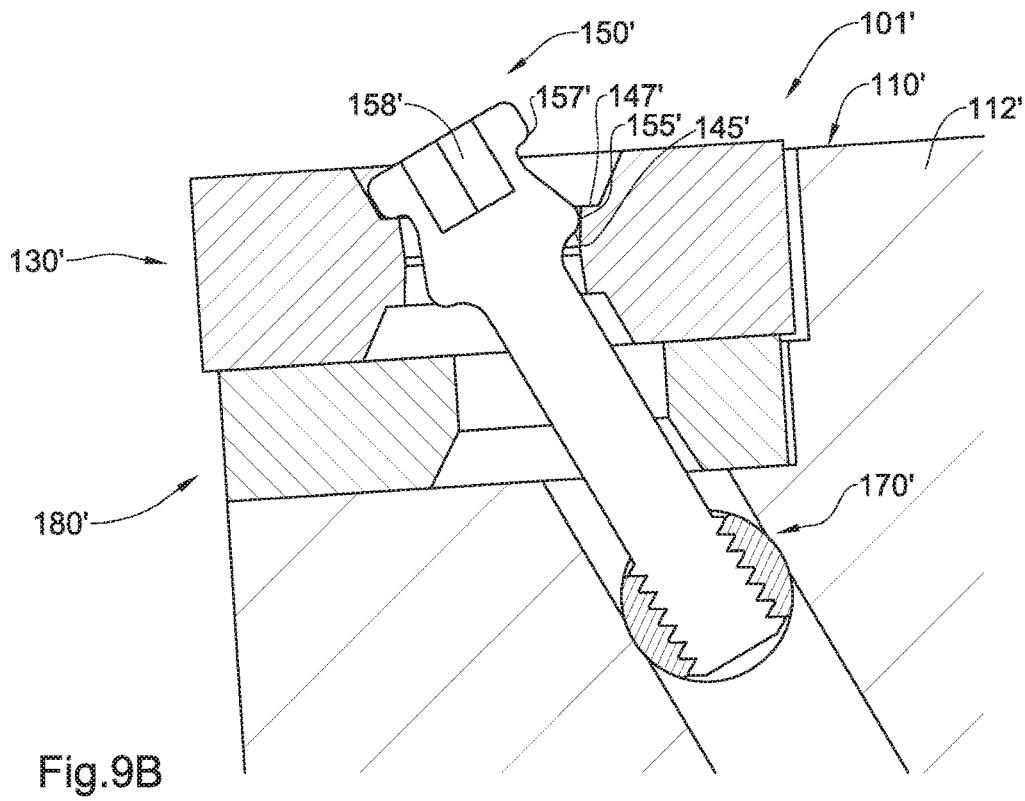
Figure 10:
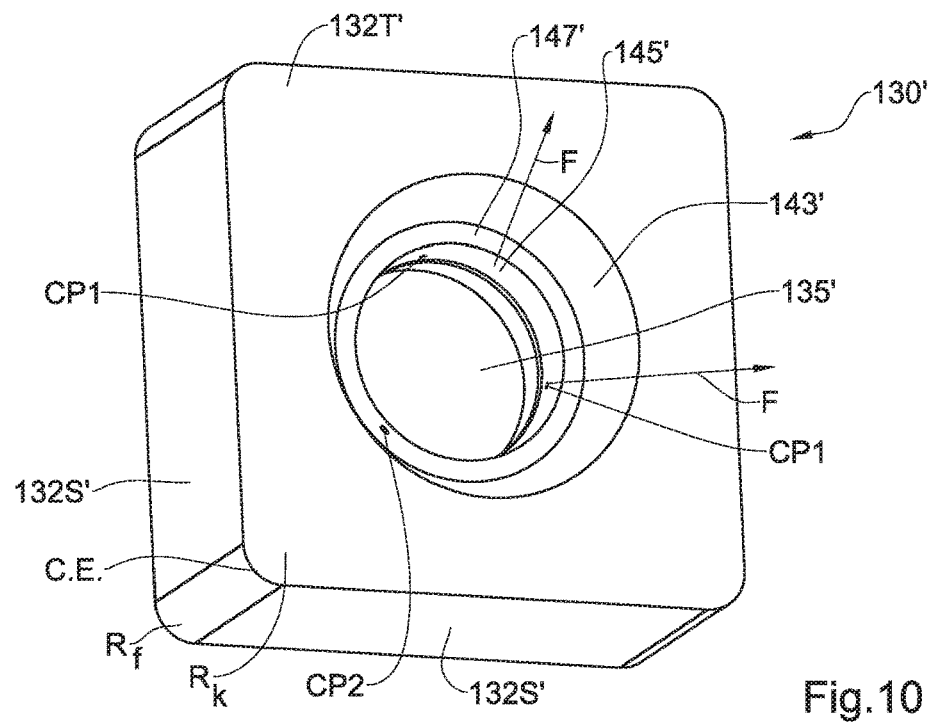
FIG. 10 is a schematic isometric view of a cutting insert used in the turning tool shown in FIGS. 9A and 9B, showing contact points of the cutting insert with a fastening element of the turning tool.

Turning now to FIGS. 9A to 10, another example of a turning tool is shown, generally designates 101', and comprising a holder 110', a cutting insert 130', a support 180', a fastening member 150' and an anchoring mechanism 170'. Elements similar to those of the turning tool shown in FIGS. 8A to 8B are designated by the same reference numbers, only with an added ('), e.g. fastening member 150' of the present example and fastening member 150' of the previous example are variants of one another, etc.

However, contrary to the previously described example of FIGS. 8A and 8B, owing to a unique design of the cutting insert 130', the first fastening portion 157' of the fastening member 150' comes in contact with one contact point $CP_2$ along the surface 147', while the second fastening portion 155' comes into contact with two different points $CP_1$ along the fastening surface 145'.

This is illustrated more clearly in FIG. 10, in which the cutting insert 130' is shown, and in which the second fastening portion 145' is conical, and not cylindrical as described with respect to the previous example of cutting insert 130.

This arrangement provides for a more secure and robust clamping of the cutting insert 130' in the insert seat 120', as the fastening member 150' applies pressure in two points ($CP_1$), thereby applying a force F in each of these points towards a respective sidewall of the insert seat 120'.

Figure 11A:
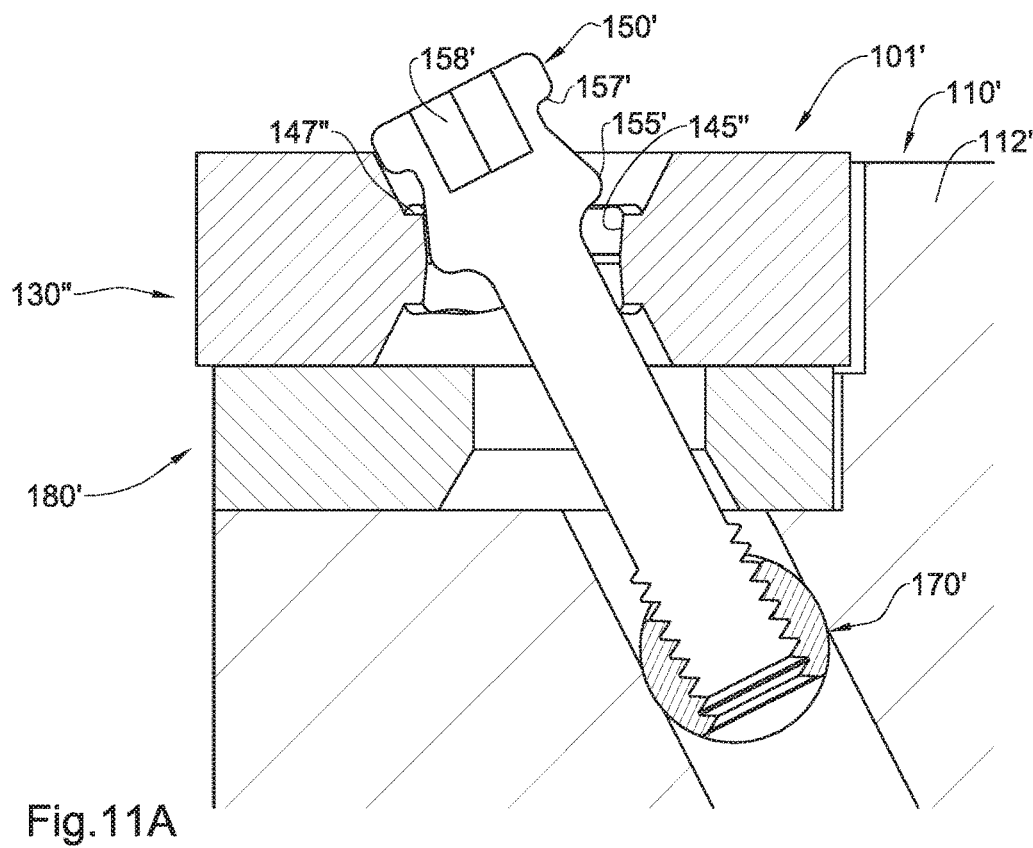
FIGS. 11A and 11B are schematic section-views of a turning tool according to another example of the present application, shown at a mounting position and a securing position thereof respectively.
Figure 11B:
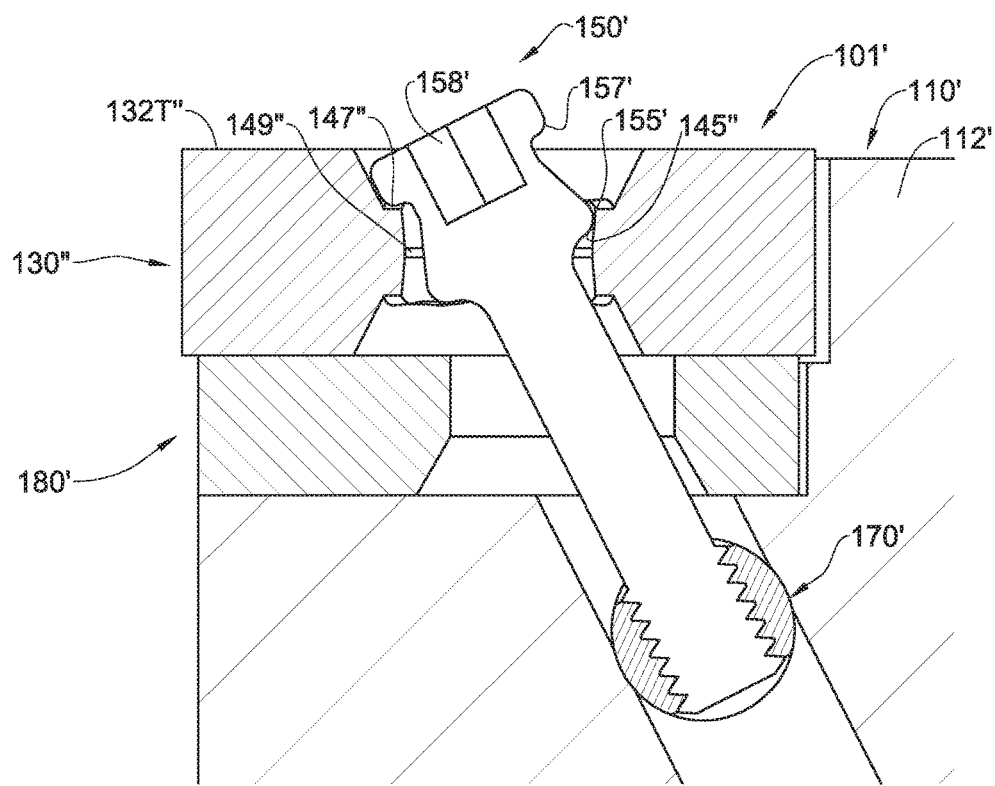
Figure 12A:
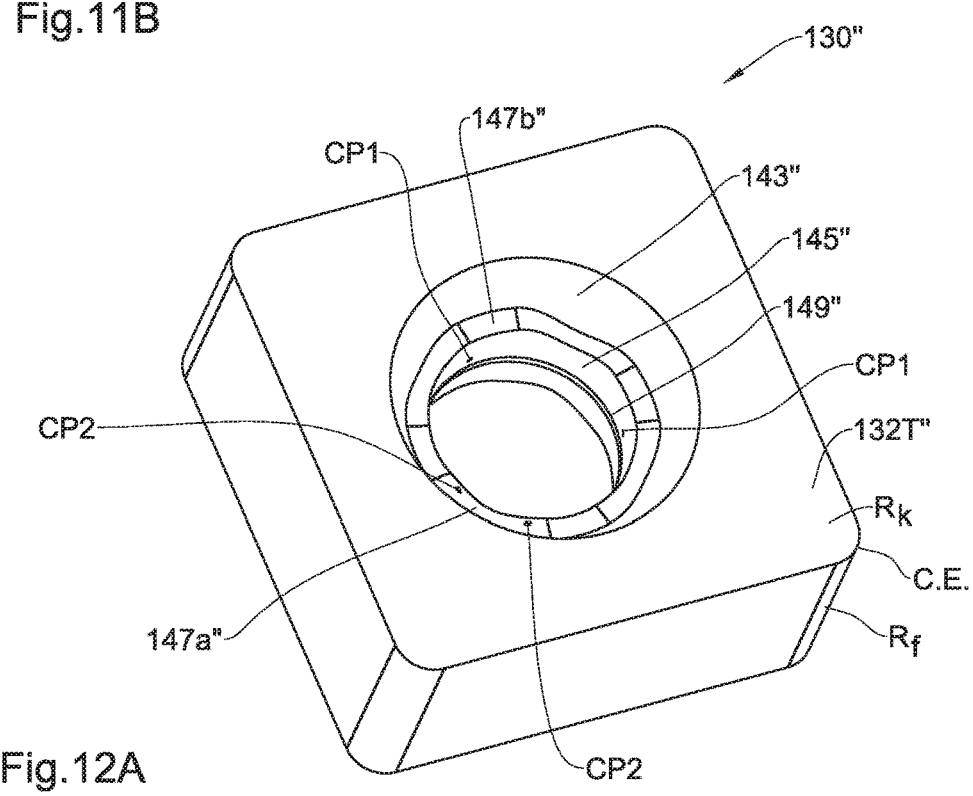
FIGS. 12A and 12B are schematic isometric views of a cutting insert used in the turning tool shown in FIGS. 11A and 11B, showing contact points of the cutting insert with a fastening element of the turning tool.
Figure 12B:
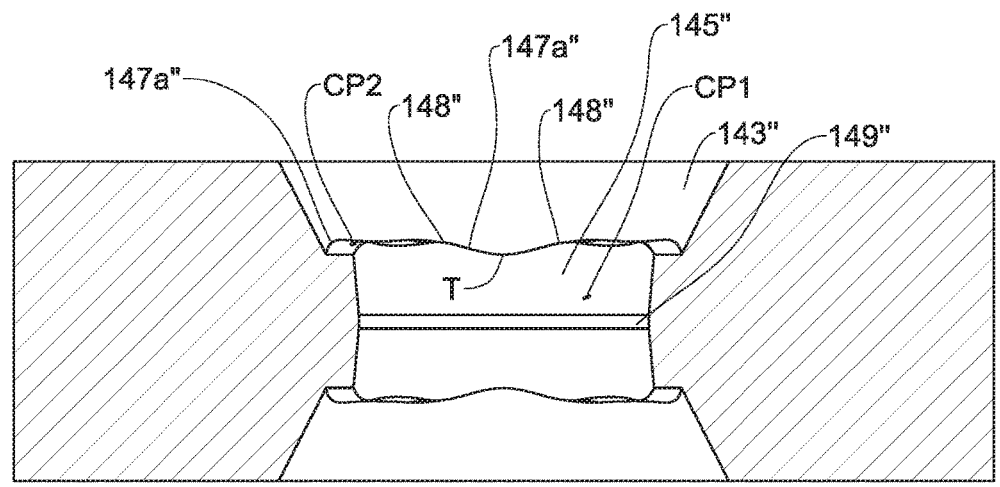

Attention is now drawn to FIGS. 11A and 11B, in which the turning tool 101' is shown, but in which the cutting insert 130' has been replaced with a different cutting insert 130". Therefore, all elements identical to those shown in FIGS. 9A to 10, maintain the same reference numbers, whereas the cutting insert 130" is marked with an added (").

The cutting insert 130" comprises a central bore 135", a first fastening surface 147a", 147b", a second fastening surface 145", a chamfer surface 143" and a central inner surface 149".

It is noted that each of the inner surfaces 147b" are portions of a circular surface, whereas each of the inner surfaces 147a" are curved to have a trough T and two raised portions 148".

Under the above configuration, when fastened, the second fastening portion 155' of the fastening member 150' comes in to contact, as previously explained with respect to FIGS. 9A to 10, with two contact points $CP_1$, but, in addition, the first fastening portion 157' now also comes into contact with two different points $CP_2$, owing to the curvature of inner surface 147a".

This, compared to the previously described example, provides a more robust clamping of the cutting insert 130", taking place along four different points along its inner surface 140". In addition, the curvature of each of the portions 147*a*" allows for self-alignment of heat portion of the fastening member 150', as it is urged to rest in the trough T between the raised portions 148", thereby leading for a more accurate and secure clamping.

Figure 13A:
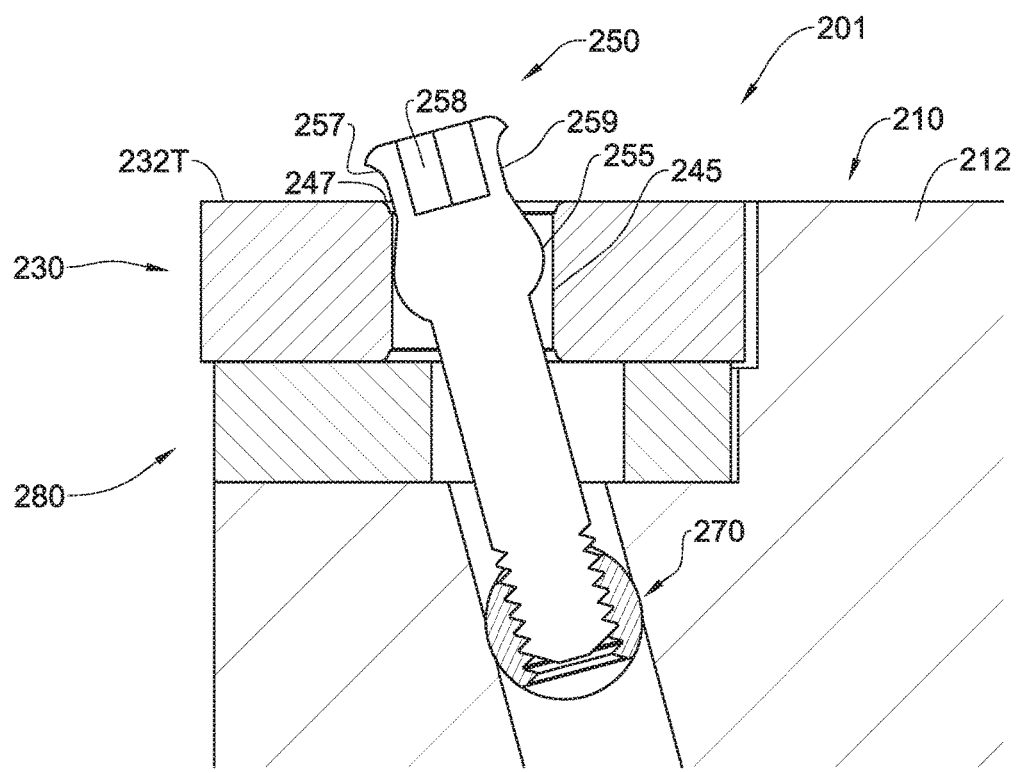
FIGS. 13A and 13B are schematic section-views of a turning tool according to another example of the present application, shown at a mounting position and a securing position thereof respectively.
Figure 13B:
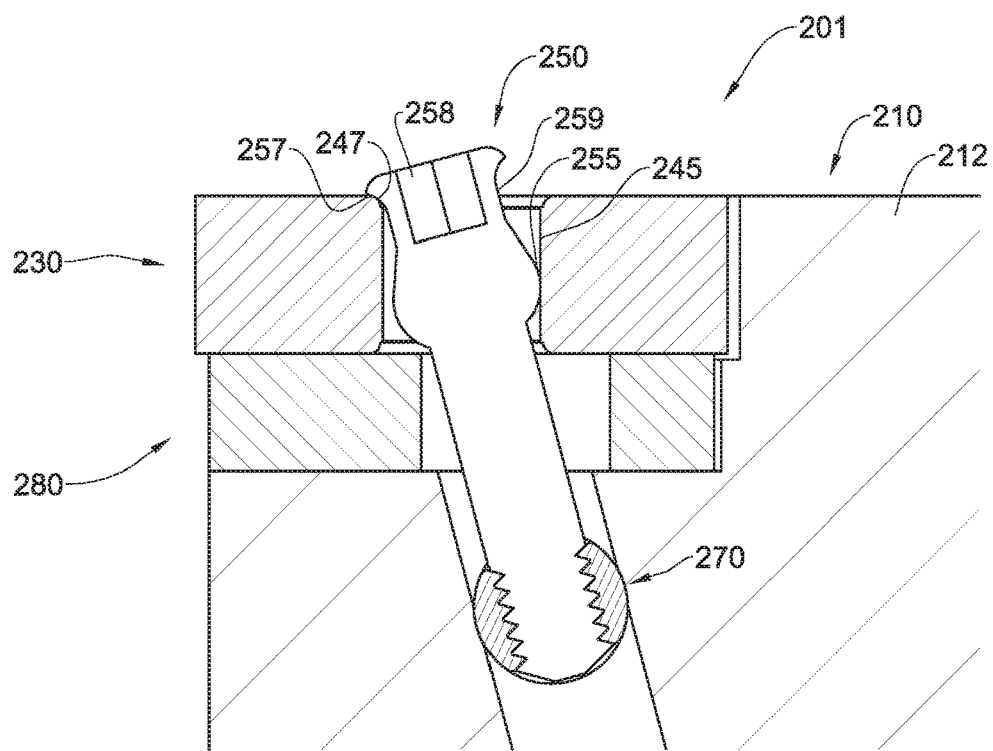

Attention is now drawn to FIGS. 13A and 13B, in which another example of a turning tool is shown, generally designated 201, and comprising a holder 210, a cutting insert 230, a support 280, a fastening member 250 and an anchoring mechanism 270. Elements similar to those of the turning tool shown in previous figures are designated by the same reference numbers, only upped by 200, e.g. fastening members 250 of the present example and fastening member 50, 150 of the previous example are variants of one another, etc.

In the present example, a standard cutting insert 230 is used, and the fastening member comprises a first fastening portion 257 and a second fastening portion 255. The first fastening portion 257 is curved, allowing the fastening member 250 to clamp down not only on a portion of the inner surface 240 of the cutting insert 230, but also on the top surface 232T thereof, thereby providing clamping down of the cutting insert at a location of the bore 235 which is remote from the sidewalls of the insert seat 220. The term 'remote' should be understood with respect to the inner surface of the cutting insert 230, i.e. the inner surface has portions closer to the sidewalls and farther (remote) from the sidewalls. At the second fastening surface 255, the fastening member 250 performs a sideways clamping of the cutting insert 230 towards the sidewalls.

Figure 14A:
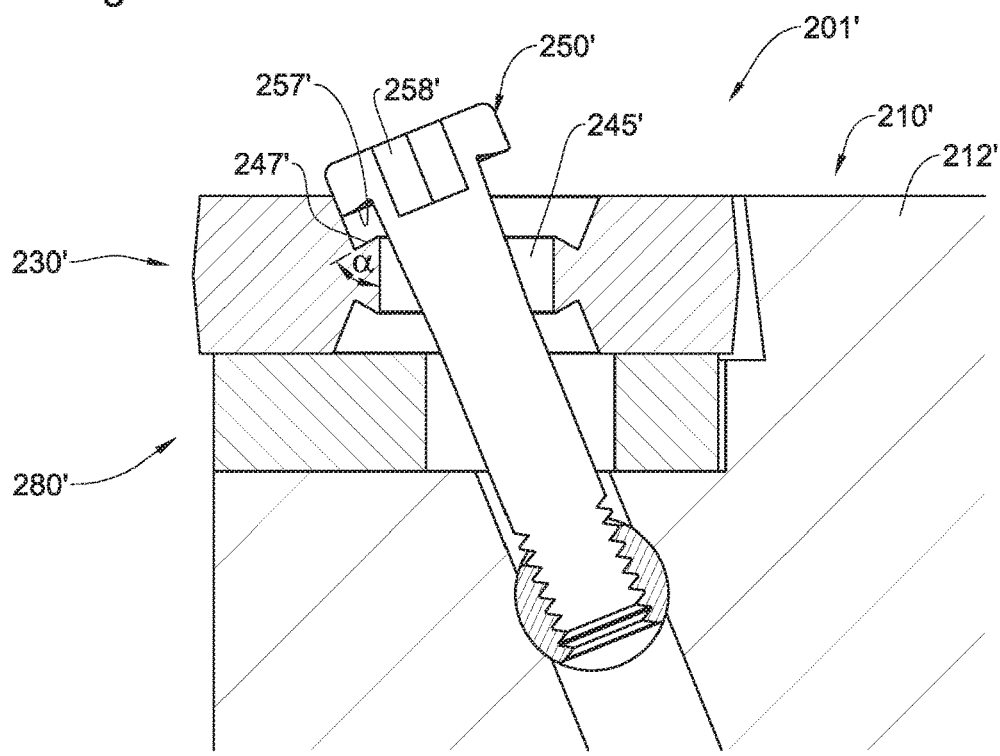
FIGS. 14A and 14B are schematic section-views of a turning tool according to another example of the present application, shown at a mounting position and a securing position thereof respectively.
Figure 14B:
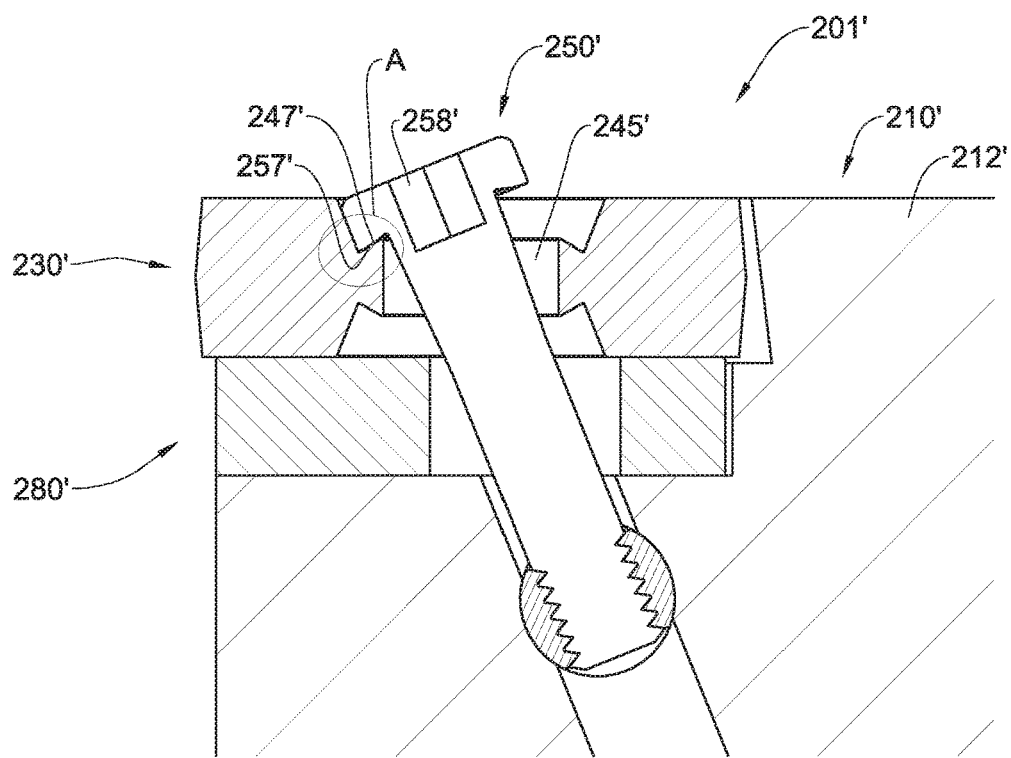

Turning now to FIGS. 14A and 14B, another example of a turning tool is shown, generally designated 201', and comprising a holder 210', a cutting insert 230', a support 280', a fastening member 250' and an anchoring mechanism 270'. Elements similar to those of the turning tool shown in previous figures are designated by the same reference numbers, only with an added ('), e.g. fastening members 250' of the present example and fastening member 50, 150, 250' of the previous example are variants of one another, etc.

In the present example, contrary to previous examples, the fastening member 250' only comes in contact with the cutting insert 230' via a singe contact surface 247', via its first fastening portion 257', on the remote side of the inner surface of the cutting insert 230', i.e. that portion of the inner surface which is closer to the cutting edge C.E.

Figure 14C:
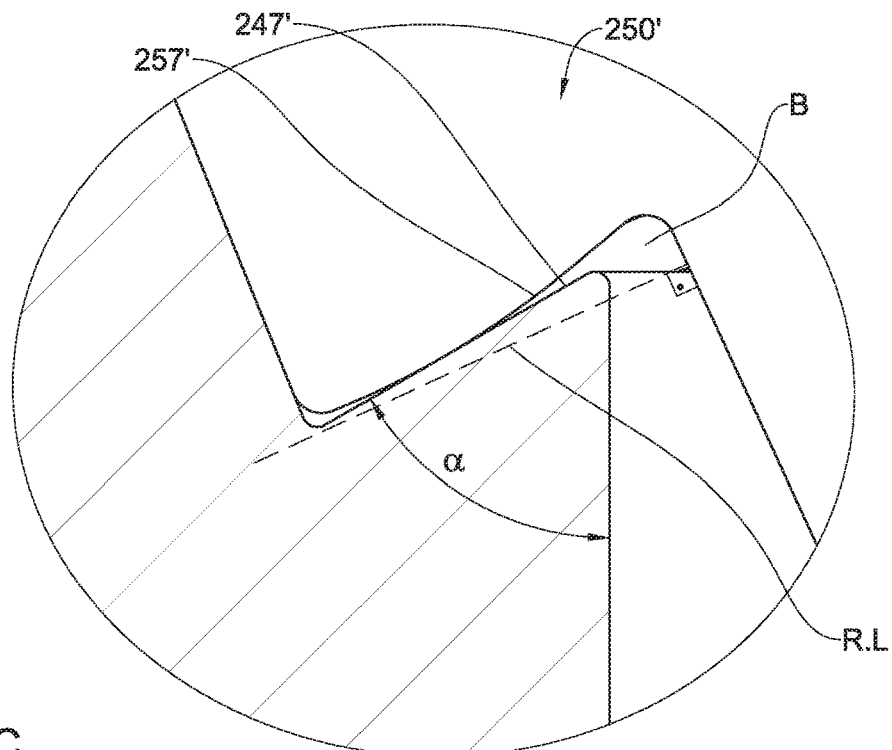
FIG. 14C is a schematic enlarged view of a detail A shown in FIG. 14B.

In addition, as shown in FIG. 14C, the first fastening surface of the cutting insert 247' is formed at an upward angle α, so that in engagement with the head portion of the fastening member 250', it is prevented from slipping sideways off the first fastening surface 247'. Specifically, the angle α is chosen such that with respect to a line R.L. extended from a peripheral region of the head portion, and perpendicular to the central axis X of the fastening member 250' (see right angle in FIG. 14C), a portion of the first fastening surface 247' of the cutting insert 230', indicated by B, is juxtaposed so as to block such slippage.

Figure 15A:
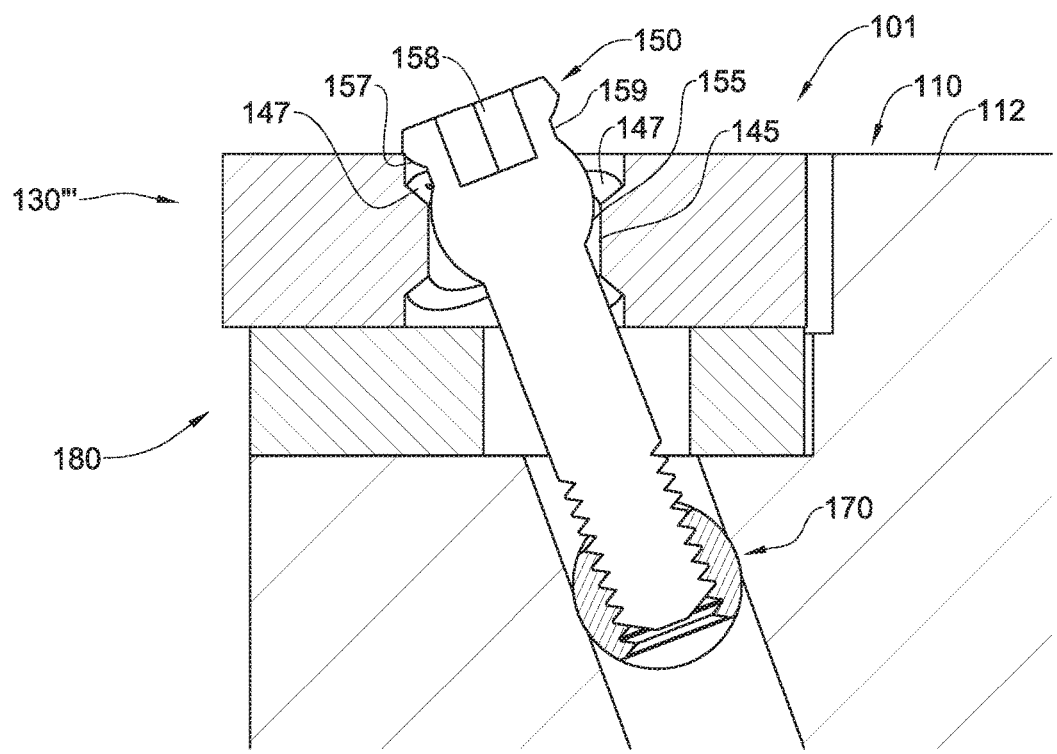
FIGS. 15A and 15B are schematic section-views of a turning tool according to another example of the present application, shown at a mounting position and a securing position thereof respectively.
Figure 15B:
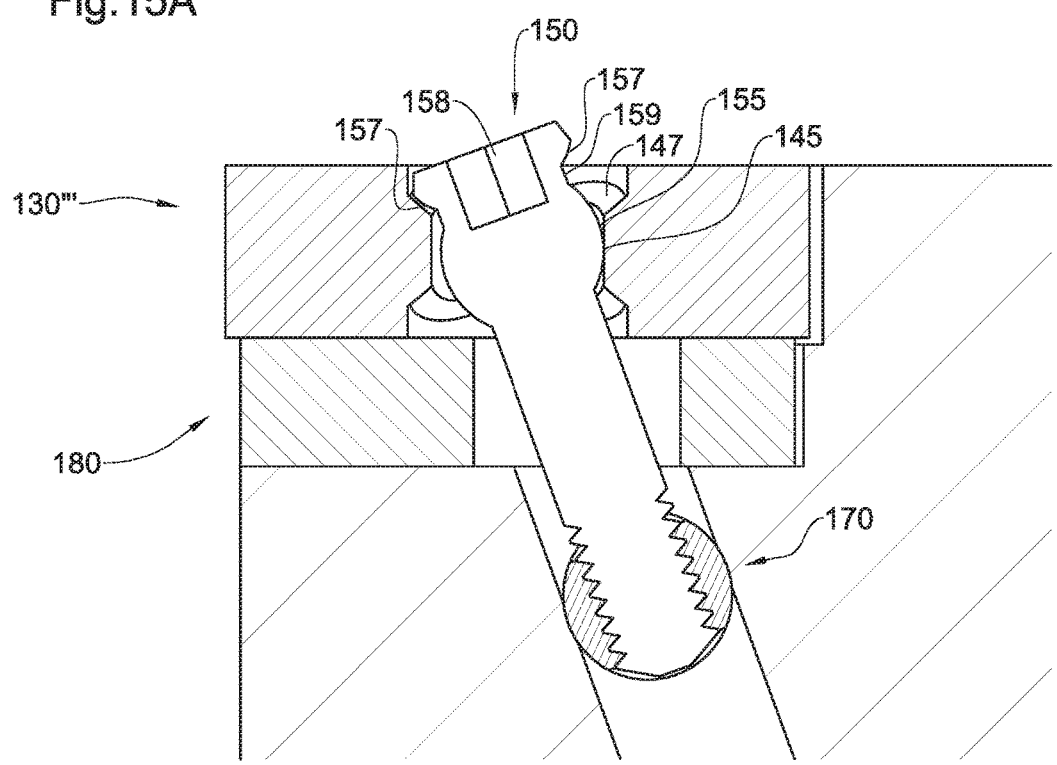

Attention is now drawn to FIGS. 15A and 15B, in which the turning tool 101 is shown, but in which the cutting insert 130 has been replaced with a different cutting insert 130'''. Therefore, all elements identical to those shown in FIGS. 8A and 8B, maintain the same reference numbers, whereas the cutting insert 130''' is marked with an added ('").

The cutting insert 130''' comprises a central bore 135''', a first fastening surface 147*a*''', 147*b*''', a second fastening surface 145''', a chamfer surface 143''' and a central inner surface 149'''. It is noted that each of the inner surfaces 147*b*''' are portions of a circular surface, whereas each of the inner surfaces 147*a*''' are curved to have a trough T and two raised portions 148'''.

Under the above configuration, when fastened, the second fastening portion 155 of the fastening member 150 comes in to contact, as previously explained with respect to FIGS. 8A and 8B, with two contact points $CP_1$, but, in addition, the first fastening portion 157 now also comes into contact with two different points $CP_2$, owing to the curvature of inner surface 147*a*'''.

In this essence, the cutting insert 130''' is similar to insert 130" previously described, only suitable for turning tool holder 110.

Figure 17A:
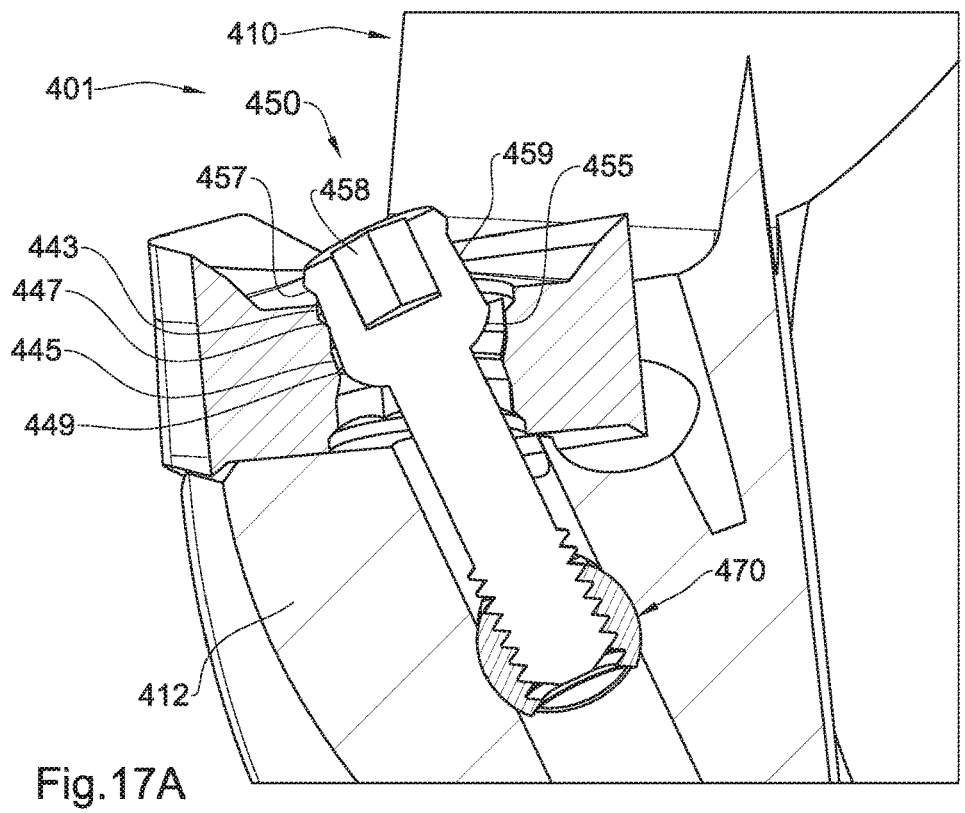
FIGS. 17A and 17B are schematic section-views of a milling tool according to another example of the present application, shown at a mounting position and a securing position thereof respectively.
Figure 17B:
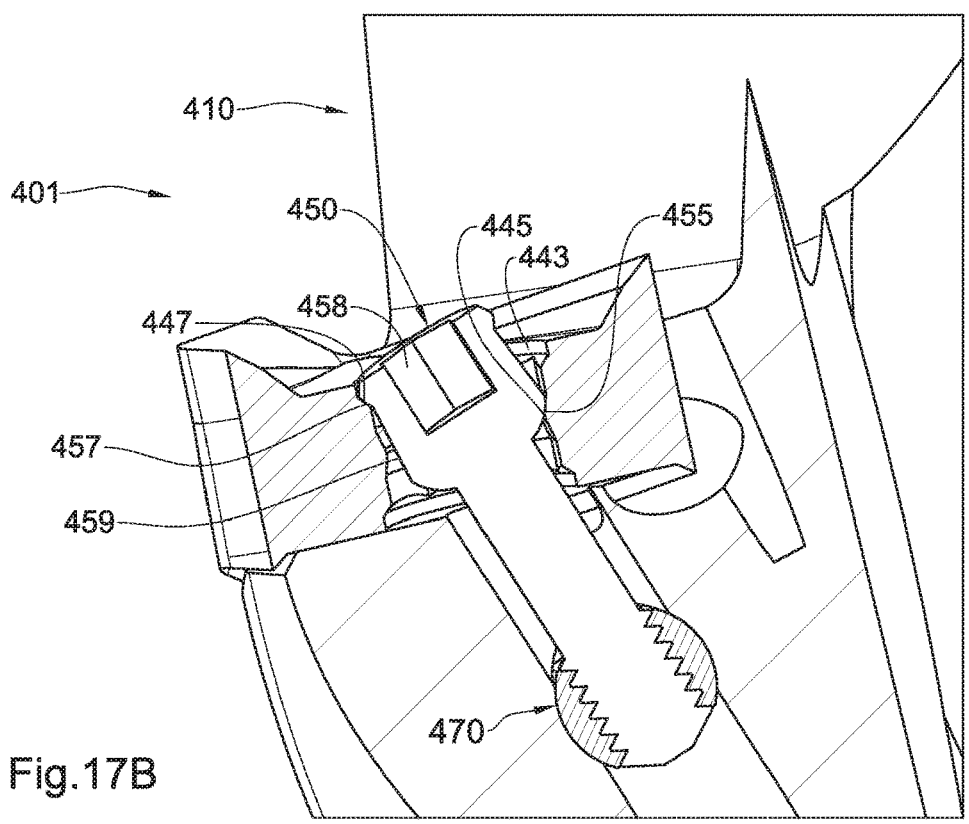
Figure 17C:
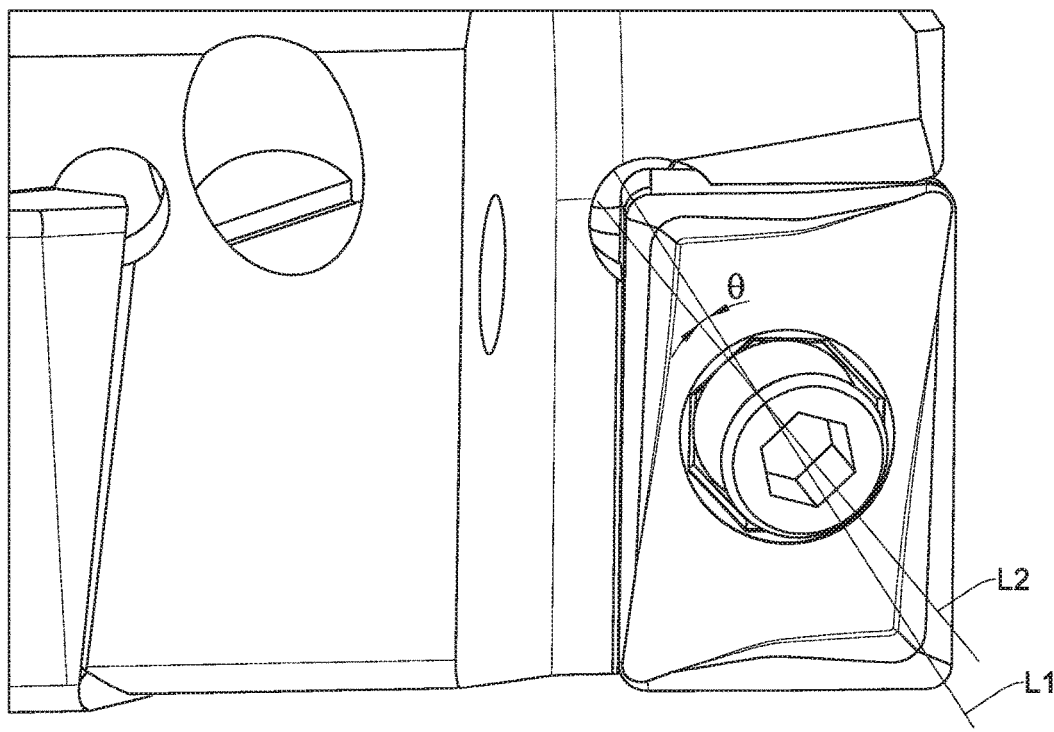
FIG. 17C is a schematic diagram of the clamping force applied to the cutting insert of the milling tool shown in FIGS. 17A and 17B.
Figure 18:
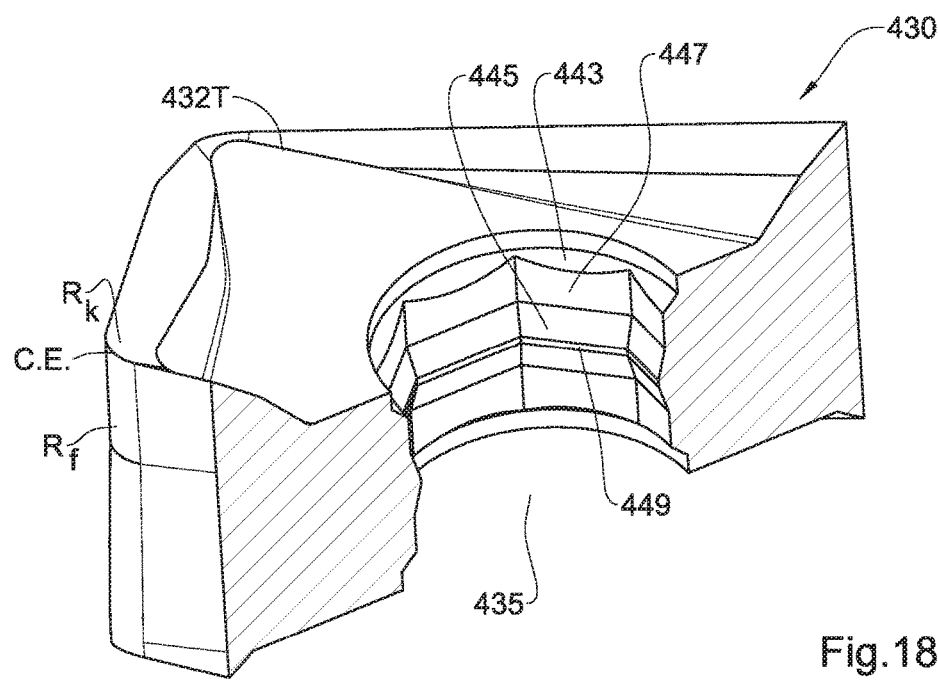
FIG. 18 is a schematic isometric view of a cutting insert used in the turning tool shown in FIGS. 17A and 17B, showing contact points of the cutting insert with a fastening element of the turning tool.
Figure 19A:
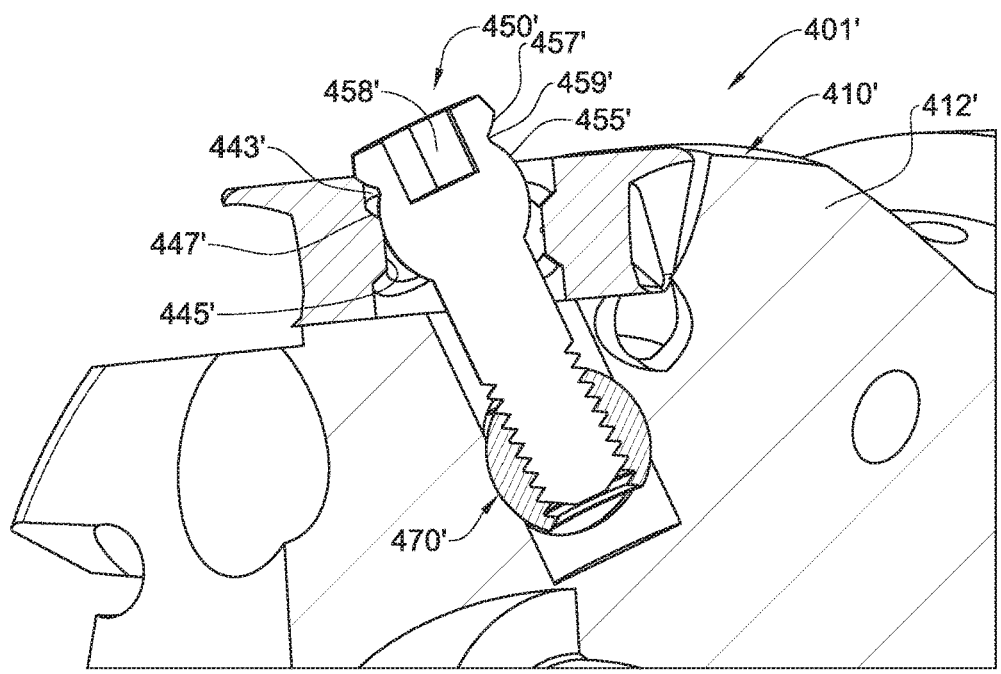
FIGS. 19A and 19B are schematic section-views of a milling tool according to another example of the present application, shown at a mounting position and a securing position thereof respectively.
Figure 19B:
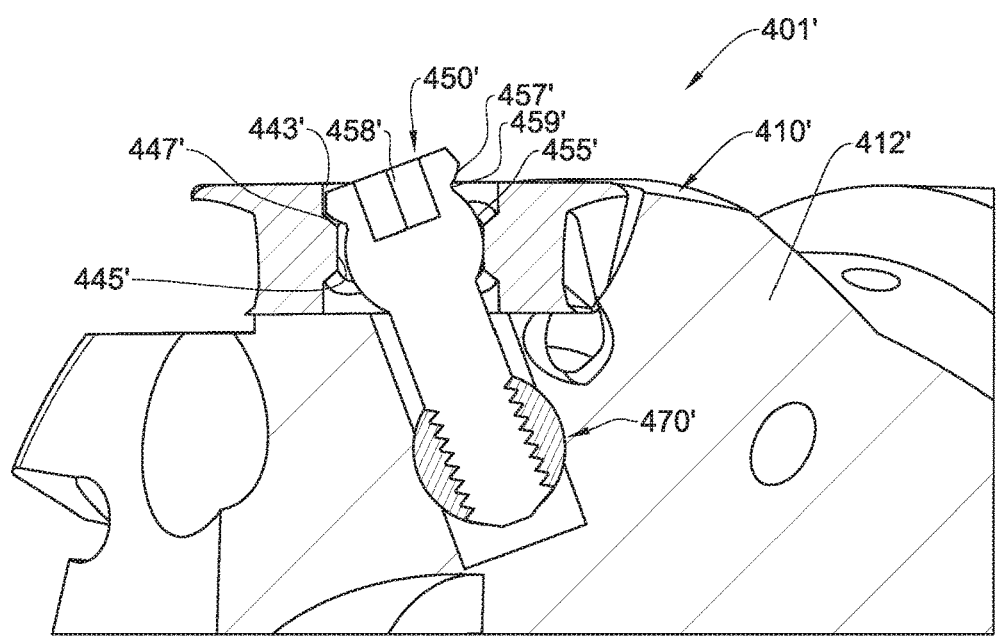
Figure 20A:
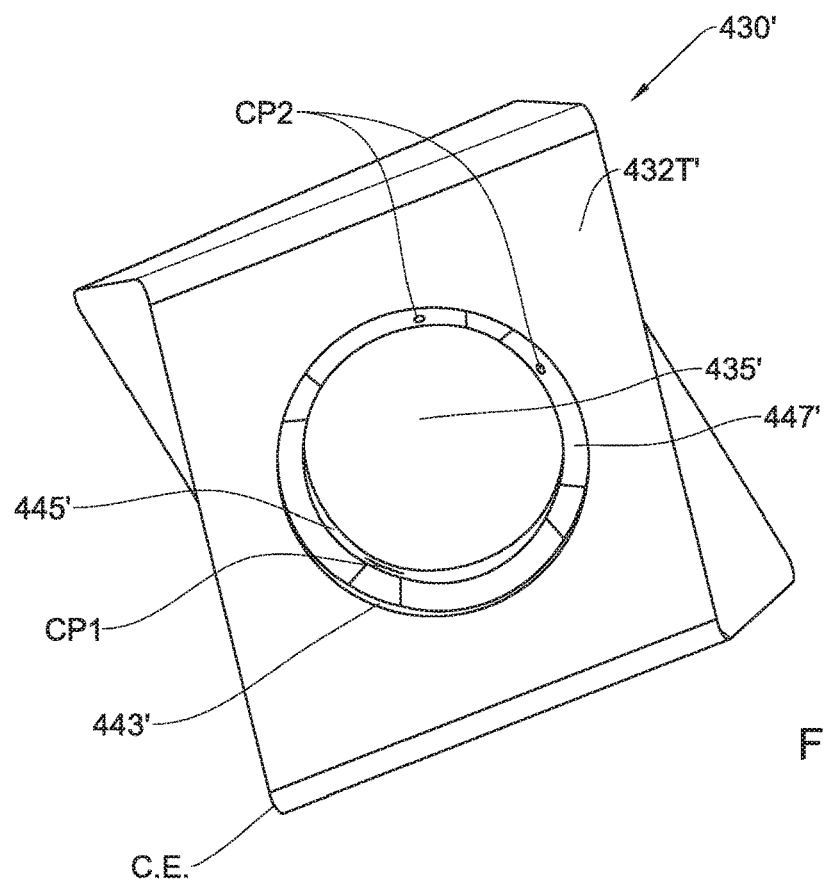
FIGS. 20A and 20B are schematic isometric views of a cutting insert used in the milling tool shown in FIGS. 19A and 19B, showing contact points of the cutting insert with a fastening element of the milling tool.
Figure 20B:
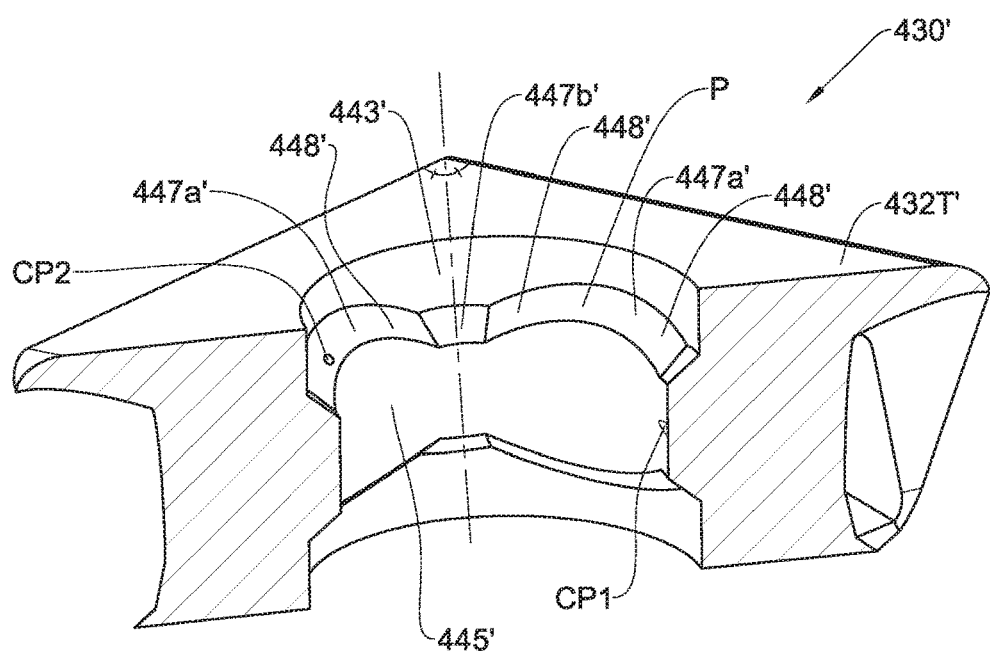

Turning now to FIGS. 17A to 18, a milling tool is shown, generally designated as 401, and having a radial arrangement of its cutting inserts 430. The milling tool 401 comprises a holder 410, a plurality of cutting inserts 430, a support 480, a fastening member 450 and an anchoring mechanism 470. Elements similar to those of the turning tool shown in previous figures are designated by the same reference numbers, only upped by 400, e.g. fastening member 450 of the present example and fastening members 50, 150, 150', 250, 250' of the previous example are variants of one another, etc.

In the present example, the fastening member 450 and clamping mechanism as a whole are similar to those described with respect to previous example, i.e. the fastening member 450 has two fastening portions 455, 457, and is configured for coming into contact with two respective surfaces 445, 447 of the inner surface of the cutting insert 430.

In addition, under the arrangement of the present example as shown in FIG. 17C, the force applied by the fastening member 450 to the cutting insert 430 is not directed along the diagonal of the cutting insert 430, i.e. across the cutting corner, but rather at an offset. Specifically, the force is applied along line L2, which is offset at an angle θ with respect to the diagonal line L1.

This arrangement facilitates more secure clamping of the cutting insert during a milling operation (as opposed to previously described tools for a turning operation), as it takes into account the forces applied to the milling tool 401 during revolution thereof and coming into contact with a workpiece.

Turning now to FIGS. 19A to 20B, another example of a milling tool is shown, generally designated 401', and having a tangential arrangement of its cutting inserts 430'. The milling tool 401' comprises a holder 410', a plurality of cutting inserts 430', a support 480', a fastening member 450' and an anchoring mechanism 470'. Elements similar to those of the turning tool shown in previous figures are designated by the same reference numbers, with an added ('), e.g. fastening member 450' of the present example and fastening members 50, 150, 150', 250, 250', 450 of the previous example are variants of one another, etc.

Under the present example, clamping of the cutting insert 430' is generally similar to that described with respect to the turning tool 150, with the insert 430' having a central bore 435', a first fastening surface 447*a*', a second fastening surface 445', a chamfer surface 443' and a central inner surface 449'.

Figure 16A:
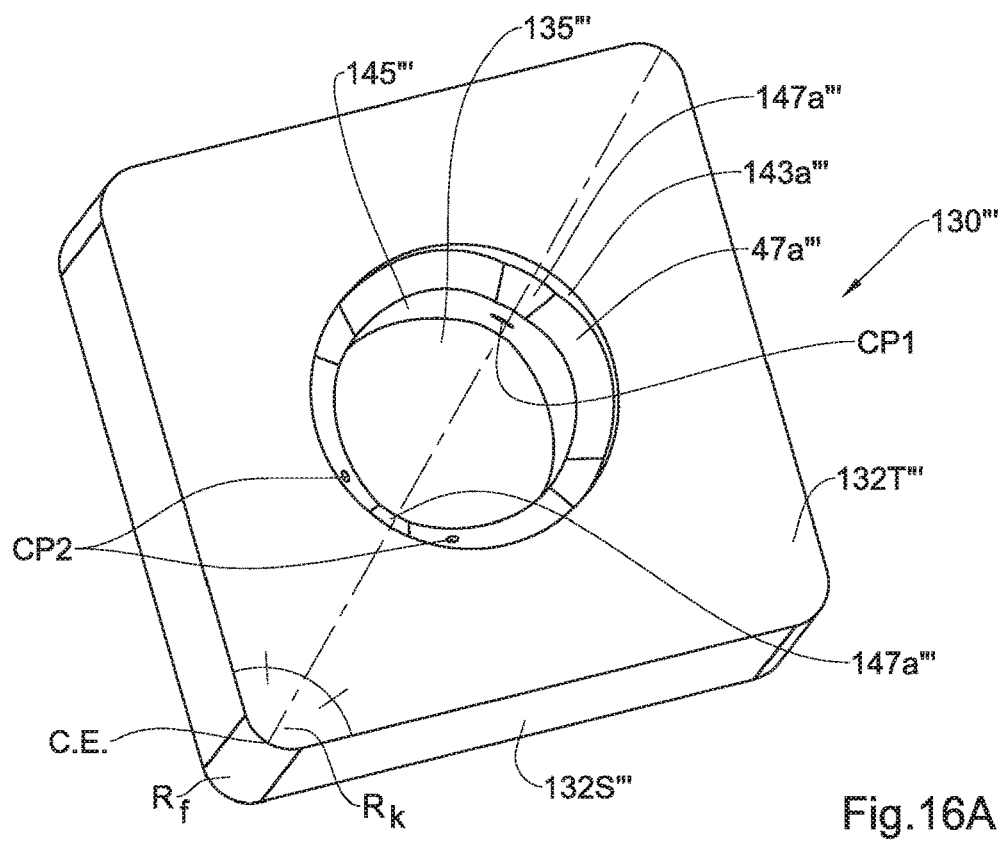
FIGS. 16A and 16B are schematic isometric views of a cutting insert used in the turning tool shown in FIGS. 15A and 15B, showing contact points of the cutting insert with a fastening element of the turning tool.
Figure 16B:
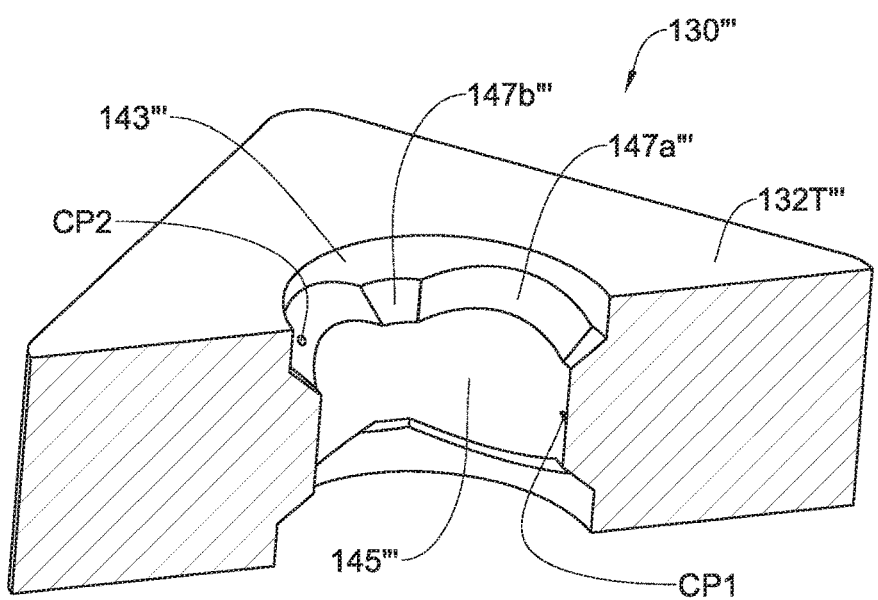

It is noted that each of the inner surfaces 447*b*' are portions of a circular surface, whereas each of the inner surfaces 447*a*' are curved to have a peak P and two lowered portions 448'. The surfaces 447*b*' are interposed between two adjacent surfaces 447*a*', and lie on a bisector of the cutting corner C.E. Thus, when the cutting insert 430' is secured, the fastening member has a first contact point to the left of the bisector and a second contact point to the right of the bisector, contributing to a more balances application of loads on the fastening member (see also FIG. 16A previously discussed).

This arrangement allows the fastening member 450' to come into contact with the cutting insert 430' at two contact points with the first fastening portion 457'. Contrary to the previous designs of the cutting inserts 130', 130" etc., in the present example, the portions 447a' are convex, having a peak P, instead of being concave and having a trough T.

In all other aspects, the cutting insert 430' and the clamping mechanis operate in a manner similar to that previously described.

Figure 21:
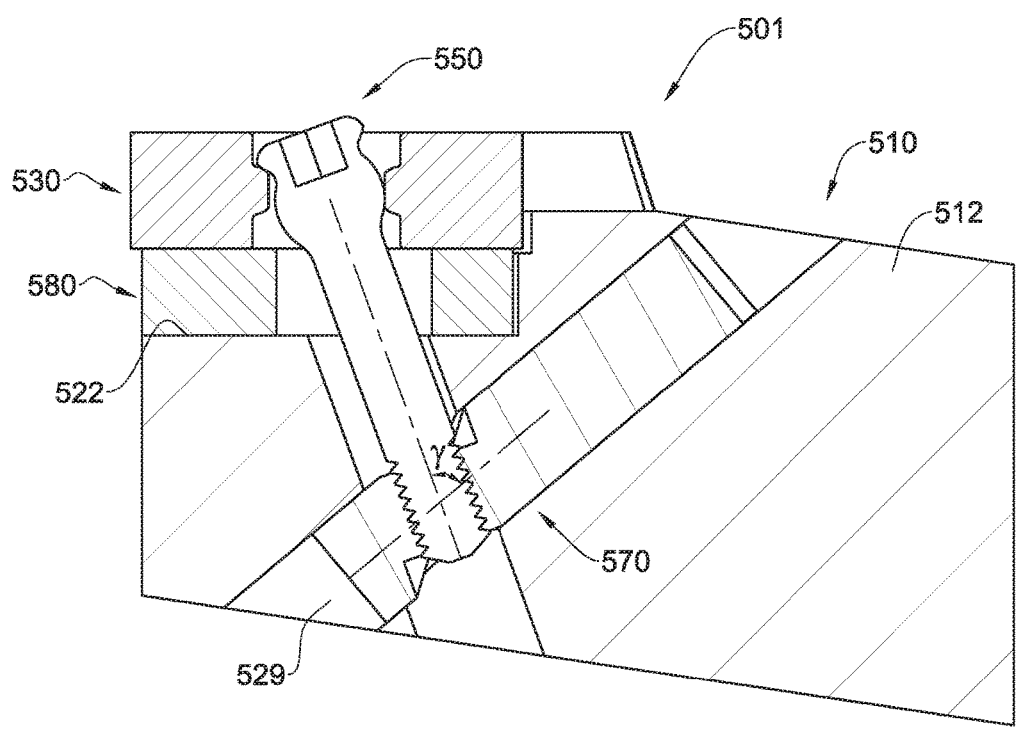
FIGS. 21 and 22 are schematic section views of a milling tool comprising two different examples of a movable clamping mechanism according to the subject matter of the present application.

Attention is now drawn to FIG. 21, in which a turning tool is shown, generally designated 501, and comprising a holder 510, a plurality of cutting inserts 530, a support 580, a fastening member 550 and an anchoring mechanism 570.

Contrary to previously described examples, the anchoring member 570 is not configured for rotation, but rather to linear displacement along a secondary bore 529 of the cutting tool holder 510. In addition, this displacement is spring biased by a spring 590, interposed between the anchoring member 570 and a closed end of the bore 529.

In operation, when the fastening member 550 is screwed in, it attempts to pull the anchoring member 570 towards the base surface 522. However, such displacement is prevented since the anchoring member 570 resides in the bore 529.

Nonetheless, owing to an angle γ between the central axis of the anchoring member 570 and the central axis of the fastening member 550, an angle which is different than 90°, threading results in sliding of the anchoring member 570 towards the closed end of the bore 529, in the direction of arrow S, against the biasing force of the spring 590.

When unscrewing the fastening member 550, the anchoring member 570 slides back to its original position under the biasing force of the spring 590.

Figure 22:
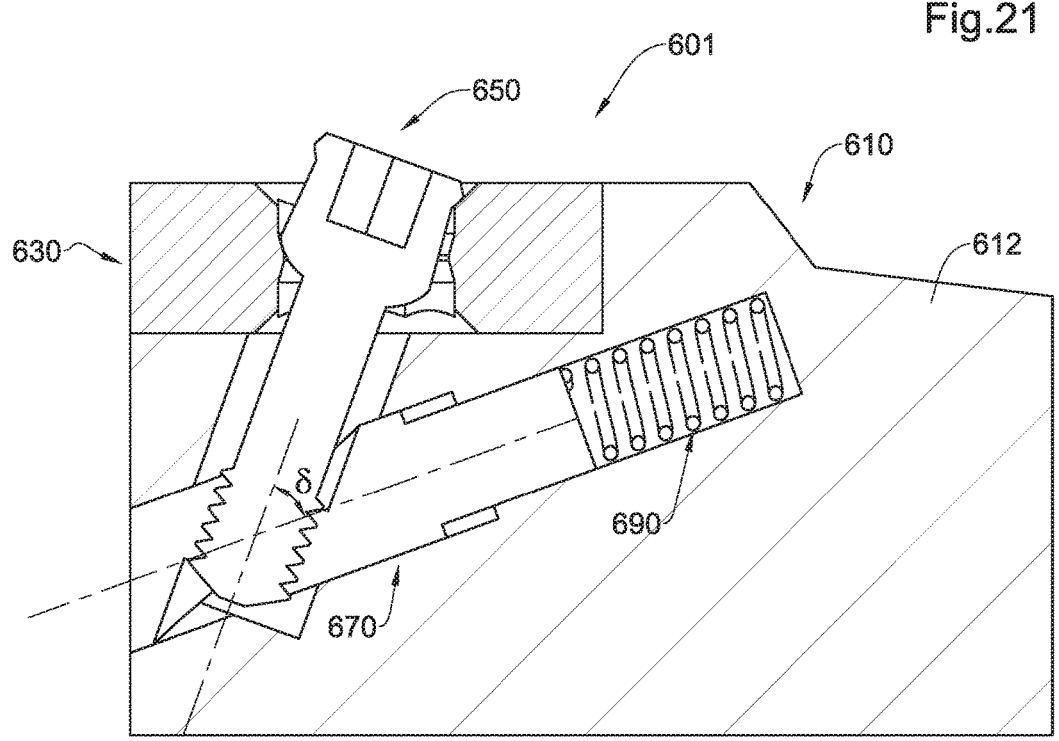

Turning now to FIG. 22, another example of a turning tool is shown, generally designated 601, and comprising a holder 610, a plurality of cutting inserts 630, a support 680, a fastening member 650 and an anchoring mechanism 670.

The turning tool 601 is similar to the turning tool 501, with the difference of the anchoring member 670 being oriented at an opposite angle δ, and that the fastening member 650 is also oriented at an opposite angle to that of fastening member 550.

Under this arrangement, similar to the previous arrangement, when the fastening member 650 is screwed in, it attempts to pull the anchoring member 670 towards the base surface 622. However, such displacement is prevented since the anchoring member 670 resides in the bore 629.

Nonetheless, owing to an angle δ between the central axis of the anchoring member 670 and the central axis of the fastening member 650, an angle which is different than 90°, threading results in sliding of the anchoring member 670 towards the closed end of the bore 629, in the direction of arrow S, against the biasing force of the spring 690.

When unscrewing the fastening member 550, the anchoring member 570 slides back to its original position under the biasing force of the spring 590.

Figure 23A:
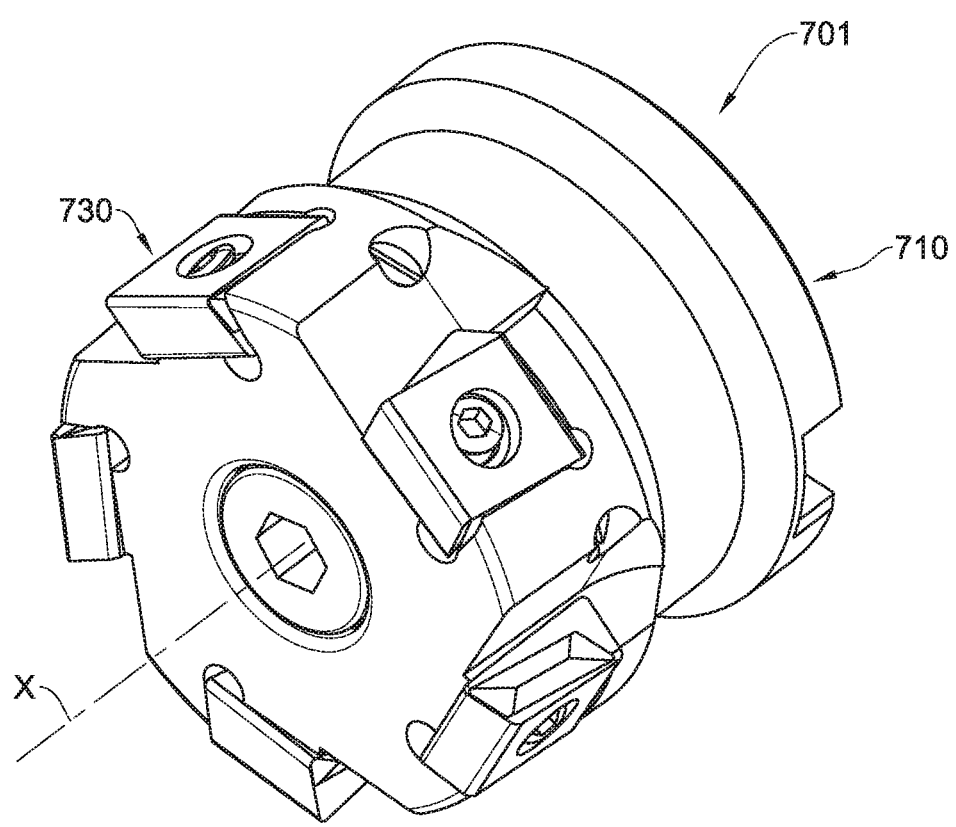
FIG. 23A is a schematic isometric view of a milling tool according to yet another example of the subject matter of the present application.
Figure 23B:
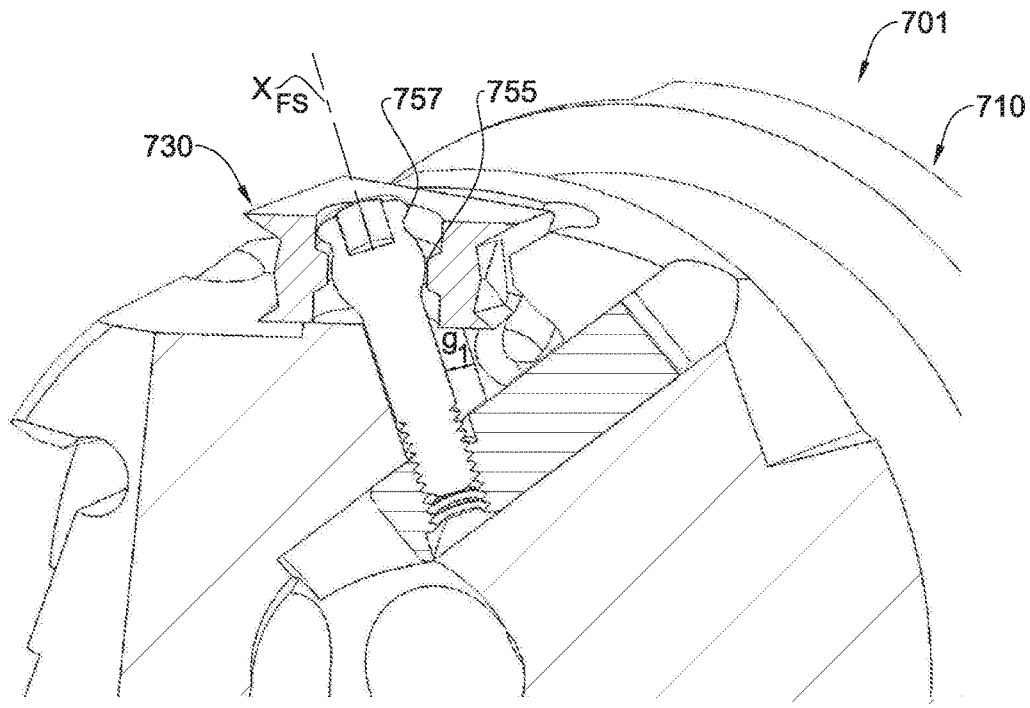
FIGS. 23B and 23C are schematic cross-section views of the milling tool shown in FIG. 23A, shown in respective mounting and securing positions of the milling tool.
Figure 23C:
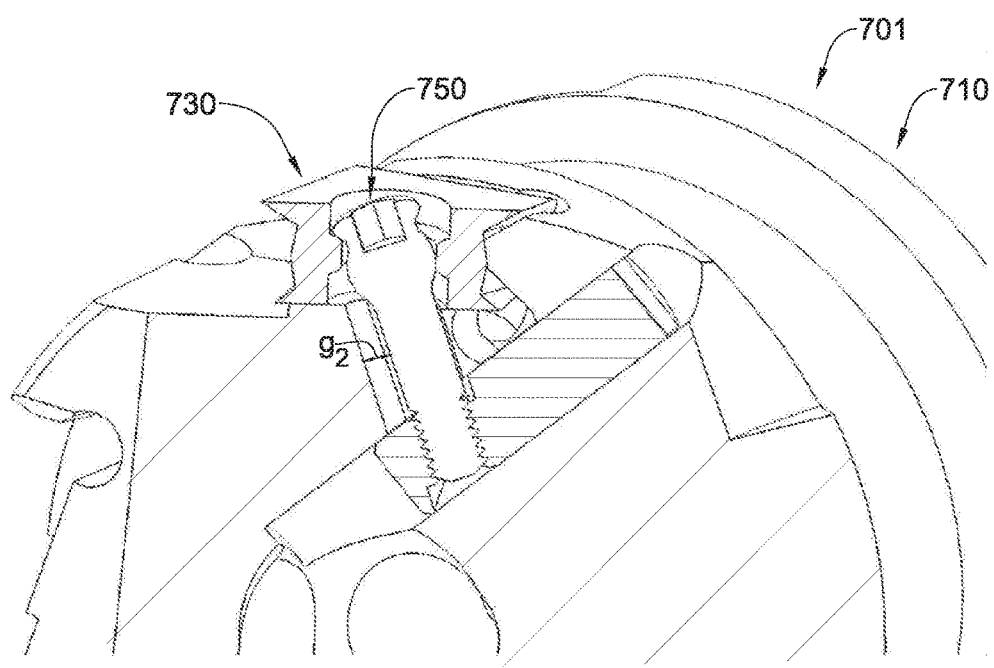

Finally, turning to FIGS. 23A to 23C, another example of a turning tool is shown, generally designated 701, and comprising a holder 710, a plurality of cutting inserts 730, a support 780, a fastening member 750 and an anchoring mechanism 770.

The turning tool 701 is similar to the turning tool 601, with the difference of the fastening member having rounded edges of its clamping portions.

Those skilled in the art to which this invention pertains will readily appreciate that numerous changes, variations, and modifications can be made without departing from the scope of the invention, mutatis mutandis.

The invention claimed is:

1. A cutting tool comprising a cutting tool holder and a cutting insert mounted thereon, said cutting insert defining an insert axis and comprising a top face, a bottom face, at least one side face extending therebetween, and an insert bore extending therebetween and comprising:
   a first clamping surface sloping from said top face and extending radially about said insert axis; and
   a second clamping surface axially spaced from said first clamping surface toward said bottom face;
said cutting tool holder comprising a body and a fastening member, said body comprising:
   an insert seat defined between side walls and a base surface, and being configured for receiving therein the cutting insert; and
   a seat bore extending along a seat bore axis and having an open end at said base surface;
said fastening member defining a fastening member axis and comprising a proximal shank portion configured for being received within said seat bore and a distal head portion extending along said axis, said fastening member being displaceable between a mounting position in which it remains in engagement with the seat bore while allowing positioning of the cutting insert into the insert seat, and a securing position in which it secures the cutting insert in the insert seat, said head portion comprising:
   a first fastening portion having a first fastening surface, tapering proximally toward said fastening member axis, for bearing, in said securing position, on said first clamping surface of the cutting insert;
   a second fastening portion axially spaced from said first fastening portion and disposed between the shank portion and the first fastening portion, the second fastening portion having a second fastening surface for bearing, in said securing position, on said second clamping surface of the cutting insert; and
   a neck portion formed between the first and second fastening portions and having a diameter less than that of each of the first and second fastening portions;
wherein when said fastening member is in said securing position, a first angle of engagement is defined between said first fastening surface and said first clamping surface with respect to said insert axis, said first angle of engagement being larger than a second angle of engagement being defined between the second fastening surface and the second clamping surface with respect to said insert axis.

2. The cutting tool according to claim 1, wherein said second fastening surface tapers proximally toward said fastening member axis.

3. The cutting tool according to claim 1, wherein said first fastening portion and at least a portion of said second fastening portion are located within said insert seat and outside said seat bore when the fastening member is in said mounting or securing position.

4. The cutting tool according to claim 1, said seat bore axis being angled with respect to the base surface of said insert seat such that when said fastening member is received within the seat bore, it is oriented in a direction which diverges away from the side walls, wherein the first fastening portion is disposed farther from the side walls than is the second fastening portion.

5. The cutting tool according to claim 1, the cutting insert being formed with a cutting edge defined at the intersection between the top face of the cutting insert and the at least one side face thereof, wherein, when the cutting insert is mounted onto the cutting tool holder so as to perform a cutting operation using said cutting edge, the engagement between the first fastening portion and the cutting insert takes place closer to an operative cutting corner of the cutting insert comprising said cutting edge than the engagement between the second fastening portion and the cutting insert, and at a higher elevation over said base surface.

6. The cutting tool according to claim 1, wherein the head portion of the fastening member is designed so as to allow said cutting insert to be mounted on and removed from the cutting tool holder over the head portion of the fastening member.

7. The cutting tool according to claim 1, further comprising an anchoring element received within an anchoring channel of the body of the cutting tool holder and configured to engage with said fastening member, said anchoring element defining an anchoring axis oriented transverse to the seat bore axis and being configured for one or more of:
   rotation about said anchoring axis;
   axial displacement about said anchoring axis; or
   lateral displacement in a direction transverse to said anchoring axis.

8. The cutting tool according to claim 7, wherein said seat bore is designed such that the fastening member may be received therewithin without engaging it.

9. The cutting tool according to claim 7, wherein the head portion of the fastening member is configured, during displacement thereof from its mounting position to its securing position, for applying on the cutting insert any one of the following or a combination thereof: axial pressure to press it against the base surface and lateral pressure to press it against one of the side walls of the seat transverse to the base surface.

10. A cutting insert to be mounted on a cutting tool holder to form a cutting tool, the cutting tool holder comprising a body and a fastening member, said body comprising:
   an insert seat having a base surface and being configured for receiving therein the cutting insert; and
   a seat bore extending along a seat bore axis and having an open end at said base surface;
said fastening member defining a fastening member axis and comprising a proximal shank portion configured for being received within said seat bore and a distal head portion extending along said axis, said fastening member being displaceable between a mounting position in which it remains in engagement with the seat bore while allowing positioning of the cutting insert into the insert seat, and a securing position in which it secures the cutting insert in the insert seat, said head portion comprising:
   a first fastening portion having a first fastening surface, tapering proximally toward said fastening member axis, for bearing, in said securing position, on the cutting insert;
   a second fastening portion axially spaced from said first fastening portion and disposed between the shank portion and the first fastening portion, the second fastening portion having a second fastening surface for bearing, in said securing position, on the cutting insert; and
   a neck portion formed between the first and second fastening portions and having a diameter less than that of each of the first and second fastening portions;
wherein said cutting insert defines an insert axis and comprises a top face, a bottom face, at least one side face extending therebetween, and an insert bore extending therebetween and comprising:
   a first clamping surface sloping from said top face and extending radially about said insert axis; and
   a second clamping surface axially spaced from said first clamping surface toward said bottom face;
said insert bore being configured such that when the cutting insert is secured in the insert seat by the fastening member in its securing position, a first angle of engagement is defined between said first fastening surface and said first clamping surface with respect to said insert axis, said first angle of engagement being larger than a second angle of engagement being defined between the second fastening surface and the second clamping surface with respect to said insert axis.

11. The cutting insert according to claim 10, wherein the first clamping surface is angled with respect to the second clamping surface.

12. The cutting insert according to claim 11, being reversible.

13. The cutting insert according to claim 10, being formed with a cutting edge defined at the intersection between the top face of the cutting insert and the at least one side face thereof, wherein, when the cutting insert is mounted onto the cutting tool holder so as to perform a cutting operation using said cutting edge, the engagement between the first fastening portion and the cutting insert takes place closer to an operative cutting corner of the cutting insert comprising said cutting edge than the engagement between the second fastening portion and the cutting insert, and at a higher elevation over said base surface.

14. A cutting tool holder configured for mounting thereof a cutting insert to form a cutting tool, the cutting insert defining an insert axis and comprising a top face, a bottom face, at least one side face extending therebetween, and an insert bore extending therebetween and comprising:
   a first clamping surface sloping from said top face and extending radially about said insert axis; and
   a second clamping surface axially spaced from said first clamping surface toward said bottom face;
said cutting tool holder comprising a body and a fastening member, said body comprising:
   an insert seat defined between side walls and a base surface, and being configured for receiving therein the cutting insert; and
   a seat bore extending along a seat bore axis and having an open end at said base surface;
said fastening member defining a fastening member axis and comprising a proximal shank portion configured for being received within said seat bore and a distal head portion extending along said axis, said fastening member being displaceable between a mounting position in which it remains in engagement with the seat bore while allowing positioning of the cutting insert into the insert seat, and a securing position in which it secures the cutting insert in the insert seat, said head portion comprising:
   a first fastening portion having a first fastening surface, tapering proximally toward said fastening member axis, for bearing, in said securing position, on said first clamping surface of the cutting insert;
   a second fastening portion axially spaced from said first fastening portion and disposed between the shank portion and the first fastening portion, the second fastening portion having a second fastening surface for bearing, in said securing position, on said second clamping surface of the cutting insert; and
   a neck portion formed between the first and second fastening portions and having a diameter less than that of each of the first and second fastening portions;

wherein when said fastening member is in said securing position, a first angle of engagement is defined between said first fastening surface and said first clamping surface with respect to said insert axis, said first angle of engagement being larger than a second angle of engagement being defined between the second fastening surface and the second clamping surface with respect to said insert axis.

\* \* \* \* \*